US012490006B2

(12) United States Patent
Deng et al.

(10) Patent No.: US 12,490,006 B2
(45) Date of Patent: Dec. 2, 2025

(54) VIBRATION SENSORS

(71) Applicant: SHENZHEN SHOKZ CO., LTD., Guangdong (CN)

(72) Inventors: Wenjun Deng, Shenzhen (CN); Yongshuai Yuan, Shenzhen (CN); Wenbing Zhou, Shenzhen (CN); Yujia Huang, Shenzhen (CN); Jinbo Zheng, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 323 days.

(21) Appl. No.: 18/181,537

(22) Filed: Mar. 9, 2023

(65) Prior Publication Data

US 2023/0217147 A1 Jul. 6, 2023

Related U.S. Application Data

(63) Continuation of application No. PCT/CN2021/107978, filed on Jul. 22, 2021.

(30) Foreign Application Priority Data

Dec. 28, 2020 (WO) ................ PCT/CN2020/140180
Apr. 23, 2021 (CN) ......................... 202110445739.3

(51) Int. Cl.

| | |
|---|---|
| ***H04R 1/28*** | (2006.01) |
| ***H04R 1/08*** | (2006.01) |
| ***H04R 1/46*** | (2006.01) |

(52) U.S. Cl.

CPC ........... *H04R 1/083* (2013.01); *H04R 1/2807* (2013.01); *H04R 1/46* (2013.01); *H04R 2460/13* (2013.01)

(58) Field of Classification Search

CPC ............ H04R 2201/003; H04R 1/2807; H04R 1/083; H04R 2460/13

(Continued)

(56) References Cited

U.S. PATENT DOCUMENTS 5,218,870 A 6/1993 Komurasaki et al.
5,298,748 A * 3/1994 Kenny ...................... G01J 5/42 850/61

(Continued)

FOREIGN PATENT DOCUMENTS

CN 104502443 A 4/2015
CN 108513241 A 9/2018

(Continued)

OTHER PUBLICATIONS

Translation of Chinese Publication 211930871, Nov. 13, 2020 (Year: 2020).*

(Continued)

*Primary Examiner* — Katherine A Faley
(74) *Attorney, Agent, or Firm* — METIS IP LLC

(57) ABSTRACT

A vibration sensor includes a vibration receiver and an acoustic transducer. The vibration receiver includes a housing and a vibration unit. The housing forms an acoustic cavity. The vibration unit is located in the acoustic cavity and divides the acoustic cavity into a first acoustic cavity and a second acoustic cavity. The acoustic transducer is acoustically connected to the first acoustic cavity. The housing is configured to generate vibration based on an external vibration signal. The vibration unit vibrates in response to the vibration of the housing and transmits, through the first acoustic cavity, the vibration to the acoustic transducer to generate an electrical signal. The vibrating unit includes a mass element and an elastic element. A deviation between cross-sectional areas of the mass element and the first (Continued)

800 acoustic cavity perpendicular to a vibration direction of the mass unit is less than 25%.

20 Claims, 11 Drawing Sheets

(58) Field of Classification Search
USPC ................................ 381/151, 351, 162, 344
See application file for complete search history.

(56) References Cited

U.S. PATENT DOCUMENTS

| | | | | |
|---|---|---|---|---|
| 7,840,020 | B1 * | 11/2010 | Miller, III | H04R 25/604 381/357 |
| 2007/0245804 | A1 | 10/2007 | Yoshida et al. | |
| 2011/0121413 | A1 * | 5/2011 | Allen | B81B 7/0041 257/416 |
| 2013/0180316 | A1 | 7/2013 | Lin et al. | |
| 2013/0315426 | A1 * | 11/2013 | Koskowich | H04R 25/604 381/324 |
| 2014/0001580 | A1 * | 1/2014 | Bolognia | H04R 19/04 438/51 |
| 2016/0014530 | A1 | 1/2016 | Gao | |
| 2017/0015546 | A1 * | 1/2017 | Kautzsch | B81B 3/0078 |
| 2018/0058915 | A1 * | 3/2018 | Mögelin | H04R 19/005 |

FOREIGN PATENT DOCUMENTS

| | | | |
|---|---|---|---|
| CN | 208434106 | U | 1/2019 |
| CN | 110603819 | A | 12/2019 |
| CN | 209882085 | U | 12/2019 |
| CN | 210093551 | U | 2/2020 |
| CN | 111131988 | A | 5/2020 |
| CN | 210927933 | U | 7/2020 |
| CN | 210958796 | U | 7/2020 |
| CN | 211085470 | U | 7/2020 |
| CN | 111510834 | A | 8/2020 |
| CN | 111556419 | A | 8/2020 |
| CN | 211930820 | U | 11/2020 |
| CN | 211930871 | U * | 11/2020 |
| CN | 211959556 | U | 11/2020 |
| CN | 212086490 | U | 12/2020 |
| CN | 212183709 | U | 12/2020 |
| KR | 20110084581 | A | 7/2011 |
| WO | 2004068464 | A2 | 8/2004 |

OTHER PUBLICATIONS

International Search Report in PCT/CN2021/107978 mailed on Oct. 21, 2021, 8 pages.
International Search Report in PCT/CN2020/140180 mailed on Oct. 9, 2021, 8 pages.
Notice of Reasons for Rejection in Japanese Application No. 2023-524771 mailed on Jun. 10, 2024, 9 pages.
First Examination Report in Indian Application No. 202317019458 mailed on May 27, 2024, 6 pages.
The Extended European Search Report in European Application No. 21913042.4 mailed on Jan. 26, 2024, 9 pages.
First Office Action in Chinese Application No. 202110833051.2 mailed on Nov. 6, 2024, 15 pages.
The Notice of Preliminary Rejection in Korean Application No. 10-2023-7013883 mailed on May 27, 2025, 14 pages.

* cited by examiner

210

600

VIBRATION SENSORS

CROSS-REFERENCE TO RELATED APPLICATIONS

This application is a Continuation of International Application No. PCT/CN2021/107978, filed on Jul. 22, 2021, which claims priority to International Application No. PCT/CN2020/140180, filed on Dec. 28, 2020, and Chinese Patent Application 202110445739.3 filled on Apr. 23, 2021, the entire contents of each of which are incorporated herein by reference.

TECHNOLOGY FIELD

The present disclosure relates to the field of acoustics, and in particular to a vibration sensor.

BACKGROUND

A vibration sensor is an energy conversion device that converts a vibration signal into an electrical signal. When the vibration sensor is used as a bone conduction microphone, the vibration sensor can detect the vibration signal transmitted through the skin when a person speaks and convert the vibration signal transmitted from the person's skin into the electrical signal, thereby achieving the effect of transmitting sound. The sensitivity of the vibration sensor affects the quality of the sound it transmits, and the current vibration sensor is generally not sensitive enough. Therefore, it is desirable to provide a vibration sensor with improved sensitivity.

SUMMARY

An aspect of the present disclosure provides a vibration sensor. The vibration sensor includes a vibration receiver including a housing and a vibration unit. The housing forms an acoustic cavity. The vibration unit is located in the acoustic cavity and divides the acoustic cavity into a first acoustic cavity and a second acoustic cavity. The vibration sensor further includes an acoustic transducer acoustically connected to the first acoustic cavity. The housing is configured to generate vibration based on an external vibration signal. The vibration unit vibrates in response to the vibration of the housing and transmits, through the first acoustic cavity, the vibration to the acoustic transducer to generate an electrical signal. The vibrating unit includes a mass element and an elastic element. A deviation between cross-sectional areas of the mass element and the first acoustic cavity perpendicular to a vibration direction of the mass unit is less than 25%.

In some embodiments, in a frequency range less than 1000 Hz, a sensitivity of the vibration sensor is greater than or equal to −40 dB.

In some embodiments, a vibration amplitude of the mass element is inversely proportional to a square of a resonant frequency of the vibration sensor.

In some embodiments, a sensitivity of the vibration sensor is proportional to a ratio of an air pressure of the first acoustic cavity to an initial air pressure of the first acoustic cavity, or a ratio of a volume change of the first acoustic cavity to the initial volume of the first acoustic cavity, or a ratio of a product of the vibration amplitude of the mass element and the cross-sectional area of the first acoustic cavity perpendicular to the vibration direction of the mass unit to an initial volume of the first acoustic cavity. By setting at least one of the initial volume of the first acoustic cavity, the area of the first acoustic cavity, and the resonant frequency, the sensitivity is greater than a threshold.

In some embodiments, the acoustic transducer includes at least one air inlet. The initial volume of the first acoustic cavity includes the volume of the at least one air inlet.

In some embodiments, the elastic element is connected around a sidewall of the mass element. The elastic element extends to the acoustic transducer and is connected to the acoustic transducer directly or indirectly.

In some embodiments, a width of the elastic element from one side close to the mass element to the other side away from the mass element is 10-500 um.

In some embodiments, the width of the elastic element from one side close to the mass element to the other side away from the mass element is variable. The variation is less than or equal to 300 um.

In some embodiments, the housing is connected to the acoustic transducer. One end of the elastic element extending to the acoustic transducer is directly connected to the acoustic transducer.

In some embodiments, the vibration receiver further includes a substrate arranged on the acoustic transducer. One end of the elastic element extending to the acoustic transducer is connected to the substrate.

In some embodiments, the substrate includes a base plate and a sidewall. The base plate is connected to the acoustic transducer. An inner surface of the sidewall is connected to the elastic element.

In some embodiments, a thickness of the base plate is 50-150 um. A length of the sidewall along a direction away from the base plate is 20-200 um.

In some embodiments, a resonant frequency of the vibration sensor is 1000 Hz-5000 Hz.

In some embodiments, the resonant frequency of the vibration sensor is 1000 Hz-4000 Hz.

In some embodiments, the resonant frequency of the vibration sensor is 2000 Hz-3500 Hz.

In some embodiments, the elastic element is in direct contact or spaced from the housing.

In some embodiments, the elastic element includes a first elastic portion and a second elastic portion. Two ends of the first elastic portion are respectively connected to a sidewall of the mass element and the second elastic portion. The second elastic portion extends to the acoustic transducer and is connected to the acoustic transducer directly or indirectly.

In some embodiments, a material of the elastic element includes at least one of silicone rubber, silicone gel, or silicone sealant.

In some embodiments, a Shore hardness of the elastic element is 1-50 HA.

In some embodiments, a surface of the elastic element away from the acoustic transducer is lower than a surface of the mass element away from the acoustic transducer.

In some embodiments, at least one of the housing or the mass element is provided with at least one pressure relief hole.

In some embodiments, the volume of the first acoustic cavity is smaller than the volume of the second acoustic cavity.

In some embodiments, a height of the first acoustic cavity along the vibration direction of the mass unit is 1-100 um. A height of the second acoustic cavity along the vibration direction of the mass unit is 50-200 um.

In some embodiments, a thickness of the mass element along the vibration direction of the mass unit is 50-1000 um.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein.

DETAILED DESCRIPTION

Figure 1:
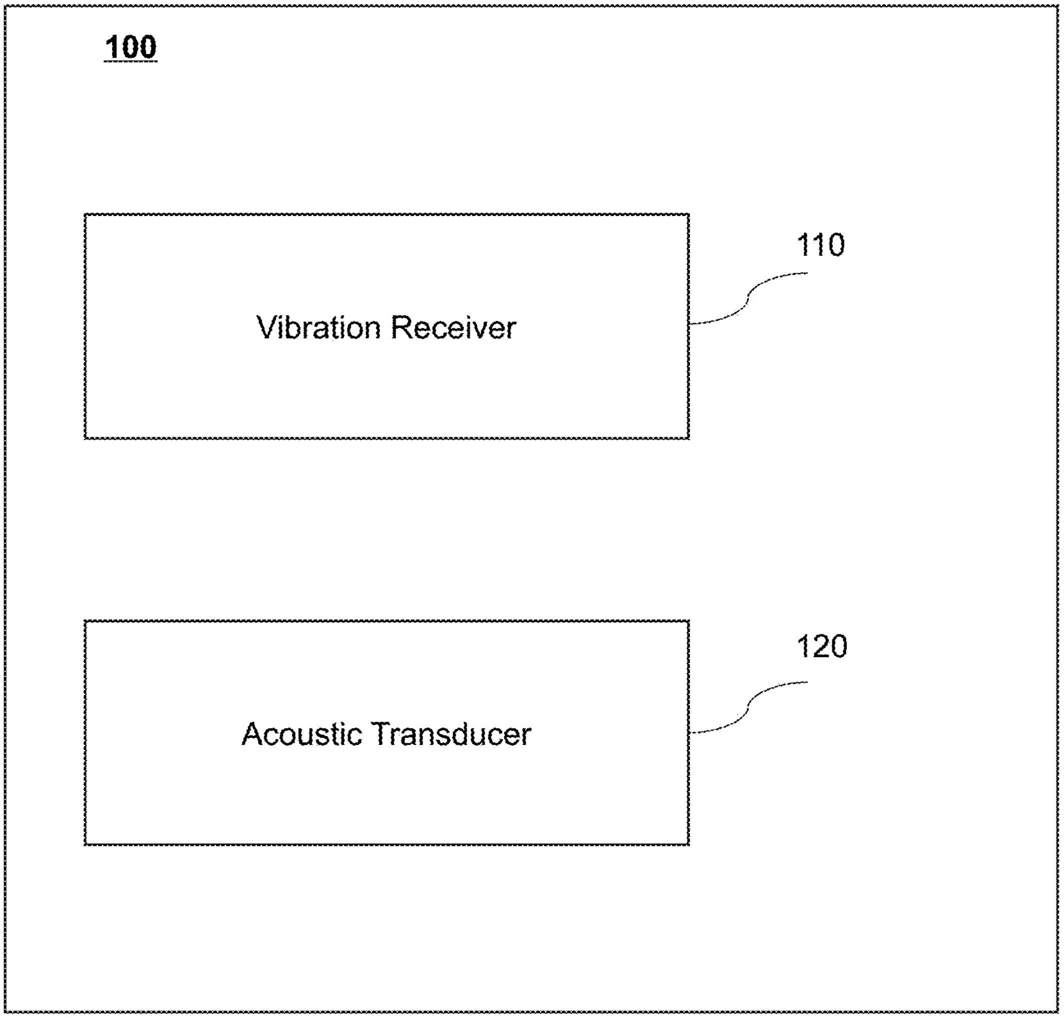
FIG. 1 is a schematic diagram illustrating a structure of a vibration sensor according to some embodiments of the present disclosure.

To more clearly illustrate the technical solutions of the embodiments of the present disclosure, the accompanying drawings that need to be used in the description of the embodiments would be briefly introduced below. Obviously, the accompanying drawing in the following description is merely some examples or embodiments of the present disclosure, and those skilled in the art can apply the present disclosure to other similar situations according to the drawings without any creative effort. Unless obviously obtained from the context or the context illustrates otherwise, the same numeral in the drawings indicates the same structure or operation.

It will be understood that the terms "system," "device," "unit," and/or "module" used herein are used to distinguish different components, elements, parts, sections, or assemblies of different levels. However, the terms may be displaced by other expressions if they may achieve the same purpose.

As used in the present disclosure and the appended claims, the singular forms "a," "an," and "the" are intended to include plural referents, unless the content clearly dictates otherwise. Generally, the terms "comprise" and "include" only imply that the clearly identified steps and elements are included, but these steps and elements may not constitute an exclusive list, and the method or device may further include other steps or elements.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

The embodiments of the present disclosure provide a vibration sensor. The vibration sensor may include a vibration receiver and an acoustic transducer. The vibration receiver may include a housing and a vibration unit. The housing may form an acoustic cavity. The vibration unit may be located in the acoustic cavity and divide the acoustic cavity into a first acoustic cavity and a second acoustic cavity. The acoustic transducer may be acoustically connected to the first acoustic cavity. The housing may be configured to generate vibration based on an external vibration signal (e.g., a signal generated by vibration of bones, skin, etc., when a user is speaking). The vibration unit may vibrate in response to the vibration of the housing and transmit, through the first acoustic cavity, the vibration to the acoustic transducer to generate an electrical signal. The vibration unit may include a mass element and an elastic element. A deviation between cross-sectional areas of the mass element and the first acoustic cavity perpendicular to a vibration direction of the mass element is less than 25%, which improves a volume compression ratio of air in the first acoustic cavity during a vibration process of the vibration unit, thereby improving the sensitivity of the vibration sensor.

In some embodiments, the elastic element may be connected around a sidewall of the mass element and extend to the acoustic transducer to connect to the acoustic transducer directly or indirectly, such that the elastic element undergoes a shear deformation during the vibration process of the vibration unit. Compared to tensile and compressive deformations, the shear deformation reduces a spring coefficient of the elastic element, which reduces a resonant frequency of the vibration sensor, thereby increasing a vibration amplitude of the mass element during the vibration process of the vibration unit and improving the sensitivity of the vibration sensor.

FIG. 1 is a schematic diagram illustrating a structure of a vibration sensor 100 according to some embodiments of the present disclosure. As shown in FIG. 1, the vibration sensor 100 may include a vibration receiver 110 and an acoustic transducer 120. In some embodiments, the vibration receiver 110 and the acoustic transducer 120 may be physically connected. The physical connection in the present disclosure may include welding, snap-fitting, gluing, integral molding, or the like, or any combination thereof.

In some embodiments, the vibration sensor 100 may be used as a bone conduction microphone. When being used as the bone conduction microphone, the vibration sensor 100 may receive a vibration signal from bones, skin, and other tissues generated when the user is speaking and convert the vibration signal into an electrical signal containing sound information. Since the vibration sensor 100 hardly collects sound (or vibration) in the air, the vibration sensor 100 may be immune to the influence of environment noise (e.g., the sound of others speaking in the vicinity, noise generated by passing vehicles) to a certain extent, and is suitable for use in noisy environments to collect a voice signal when the user speaks. Merely by way of example, the noisy environments may include occasions such as noisy restaurants, noisy meeting places, noisy streets, noisy near roads, noisy fire scenes, etc. In some embodiments, the vibration sensor 100 may be applied to a headphone (e.g., an air conduction headphone and a bone conduction headphone), a hearing aid, an assistive listening device, glasses, a helmet, an augmented reality (AR) device, a virtual reality (VR) device, or the like, or any combination thereof. For example, the vibration sensor 100 may be applied to the headphone as a bone conduction microphone.

The vibration receiver 110 may be configured to receive and transmit the vibration signal. In some embodiments, the vibration receiver 110 includes a housing and a vibration unit. The housing may be an internally hollow structure, and part assemblies of the vibration sensor 100 (e.g., the vibration unit) may be located in the housing. For example, the housing may form an acoustic cavity and the vibration unit may be located in the acoustic cavity. In some embodiments, a shape of the housing may be a three-dimensional structure with a regular shape such as a cuboid, a cylinder, a truncated cone, etc. or an irregular shape. In some embodiments, material of the housing may include a metal (e.g., copper, stainless steel), an alloy, a plastic, or the like, or any combination thereof. In some embodiments, the housing may have a certain thickness to ensure sufficient strength to better protect the assemblies of the vibration sensor 100 (e.g., the vibration unit) set in the housing. In some embodiments, the vibration unit may divide the acoustic cavity formed by the housing into a first acoustic cavity and a second acoustic cavity. The first acoustic cavity may be acoustically connected to the acoustic transducer 120. The acoustic connection may be a connection capable of transmitting acoustic pressure, sound waves, or vibration signals.

The acoustic transducer 120 may receive a vibration signal and convert the received vibration signal into an electrical signal containing sound information. In some embodiments, the vibration signal may be received through the vibration receiver 110 and transmitted to the first acoustic cavity, which may transmit the vibration signal to the acoustic transducer 120 through the acoustic connection. In some embodiments, when the vibration sensor 100 is operating, the housing may vibrate based on an external vibration signal (e.g., a signal generated by vibration of bones, skin, etc., when the user is speaking). The vibration unit may vibrate in response to the vibration of the housing and transmit the vibration to the acoustic transducer 120 through the first acoustic cavity. For example, the vibration of the vibration unit may cause a volume change of the first acoustic cavity, thereby causing a change of air pressure within the first acoustic cavity, and the change of air pressure within the first acoustic cavity is converted into a change of acoustic pressure within the first acoustic cavity. The acoustic transducer 120 may detect the change of the acoustic pressure within the first acoustic cavity and generate the electrical signal based thereon. For example, the acoustic transducer 120 may include a diaphragm, and the change of the acoustic pressure within the first acoustic cavity acts on the diaphragm to cause the diaphragm to vibrate (or deform), and the acoustic transducer 120 converts the vibration of the diaphragm into the electrical signal. Detailed descriptions regarding the vibration sensor 100 may be found in FIGS. 2-12 and detailed descriptions thereof.

It should be noted that the above descriptions of the vibration sensor 100 are merely provided for the purposes of illustration, and not intended to limit the scope of the present disclosure. For those skilled in the art, various amendments and variations may be made to the vibration sensor 100 under the teachings of the present disclosure. In some embodiments, the vibration sensor 100 may also include other components, for example, a power supply, to provide electrical power to the acoustic transducer 120. Those amendments and variations do not depart from the scope of the present disclosure.

Figure 2:
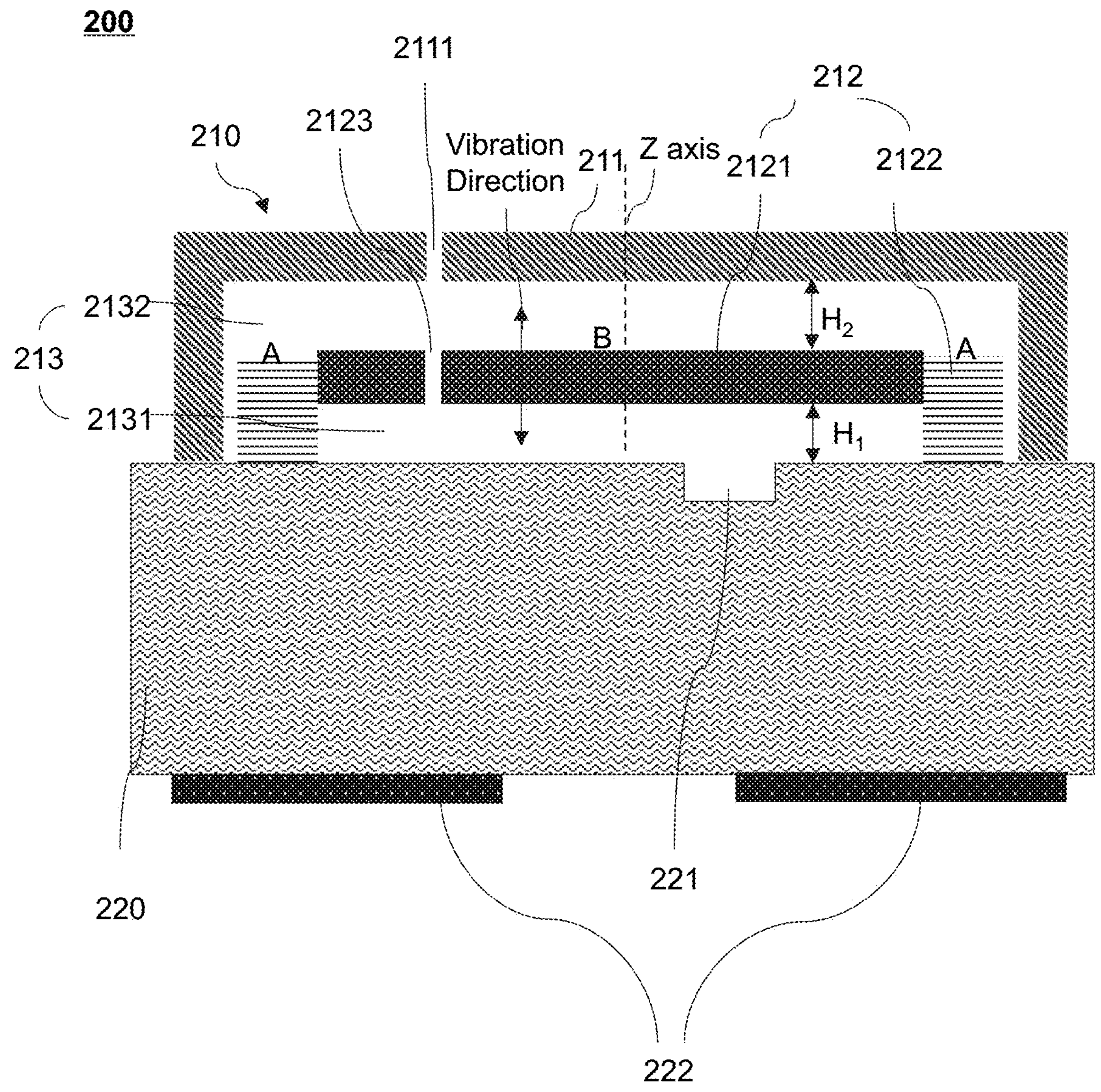
FIG. 2 is a schematic diagram illustrating a structure of a vibration sensor according to some embodiments of the present disclosure.

FIG. 2 is a schematic diagram illustrating a structure of a vibration sensor 200 according to some embodiments of the present disclosure. As shown in FIG. 2, the vibration sensor 200 may include a vibration receiver 210 and an acoustic transducer 220. The vibration receiver 210 may include a housing 211 and a vibration unit 212. In some embodiments, the housing 211 may be connected to the acoustic transducer 220 to form a structure having an acoustic cavity 213. The connection between the housing 211 and the acoustic transducer 120 may be a physical connection. In some embodiments, the vibration unit 212 may be located in the acoustic cavity 213. In some embodiments, the vibration unit 212 may divide the acoustic cavity 213 into a first acoustic cavity 2131 and a second acoustic cavity 2132. For example, the vibration unit 212 may form a second acoustic cavity 2132 with the housing 211. The vibration unit 212 may form a first acoustic cavity 2131 with the acoustic transducer 220.

In some embodiments, the first acoustic cavity 2131 may be acoustically connected to the acoustic transducer 220. Merely by way of example, the first acoustic cavity 2131 may include an air inlet 221, through which the acoustic transducer 220 may be acoustically connected to the first acoustic cavity 2131. It should be noted that, as shown in FIG. 2, a single air inlet 221 is merely provided for the purposes of illustration, and not intended to limit the scope of the present invention. It should be understood that the vibration sensor 200 may include more than one air inlet. For example, the vibration sensor 200 may include a plurality of air inlets arranged in an array.

In some embodiments, a height $H_1$ of the first acoustic cavity 2131 along a vibration direction (as shown in FIG. 2) of the vibration unit 212 is 1-500 um. The height $H_1$ of the first acoustic cavity 2131 refers to a distance between a surface of the mass element 2121 close to the acoustic transducer 220 and a surface of the acoustic transducer 220 (or a substrate) close to the mass element 2121. Preferably, the height $H_1$ of the first acoustic cavity 2131 along the vibration direction of the vibration unit 212 is 1-450 um. More preferably, the height $H_1$ of the first acoustic cavity 2131 along the vibration direction of the vibration unit 212 is 1-400 um. More preferably, the height $H_1$ of the first acoustic cavity 2131 along the vibration direction of the vibration unit 212 is 1-350 um. More preferably, the height $H_1$ of the first acoustic cavity 2131 along the vibration direction of the vibration unit 212 is 1-300 um. More preferably, the height $H_1$ of the first acoustic cavity 2131 along the vibration direction of the vibration unit 212 is 1-250 um. More preferably, the height $H_1$ of the first acoustic cavity 2131 along the vibration direction of the vibration unit 212 is 1-200 um. More preferably, the height $H_1$ of the first acoustic cavity 2131 along the vibration direction of the vibration unit 212 is 1-150 um. More preferably, the height $H_1$ of the first acoustic cavity 2131 along the vibration direction of the vibration unit 212 is 1-100 um. More preferably, the height $H_1$ of the first acoustic cavity 2131 along the vibration direction of the vibration unit 212 is 1-80 um. More preferably, the height $H_1$ of the first acoustic cavity 2131 along the vibration direction of the vibration unit 212 is 1-60 um. More preferably, the height $H_1$ of the first acoustic cavity 2131 along the vibration direction of the vibration unit 212 is 1-40 um. More preferably, the height $H_1$ of the first acoustic cavity 2131 along the vibration direction of the vibration unit 212 is 1-20 um.

In some embodiments, the second acoustic cavity 2132 may have an opening structure, i.e., directly communicating with the outside. For example, the second acoustic cavity 2132 may communicate with the outside through a hole structure or an opening structure provided on the housing 211. In such cases, the change of air pressure in the second acoustic cavity 2132 has almost no effect on the vibration of the vibration unit 212. However, air conduction sound in the environment may affect a usage performance of the vibration sensor 200. To reduce the effect of the air conduction sound in the environment, in some embodiments, the second acoustic cavity 2132 may be a sealed cavity structure. In some embodiments, a volume of the second acoustic cavity 2132 may be larger than a volume of the first acoustic cavity 2131, such that during the vibration process of the vibration unit 212, the effect of the change of air pressure in the second acoustic cavity 2132 on the vibration of the vibration unit 212 may be reduced. In some embodiments, a height $H_2$ of the second acoustic cavity 2132 along the vibration direction of the vibration unit 212 may be 1-2000 um. The height $H_2$ of the second acoustic cavity 2132 refers to a distance between a surface of the mass element 2121 away from the acoustic transducer 220 and an inner surface of the housing 211 parallel to the mass element 2121. Preferably, the height $H_2$ of the second acoustic cavity 2132 along the vibration direction of the vibration unit 212 may be 1-1000 um. Preferably, the height $H_2$ of the second acoustic cavity 2132 along the vibration direction of the vibration unit 212 may be 1-500 um. Preferably, the height $H_2$ of the second acoustic cavity 2132 along the vibration direction of the vibration unit 212 may be 1-450 um. More preferably, the height $H_2$ of the second acoustic cavity 2132 along the vibration direction of the vibration unit 212 may be 1-400 um. More preferably, the height $H_2$ of the second acoustic cavity 2132 along the vibration direction of the vibration unit 212 may be 1-350 um. More preferably, along the vibration direction of the vibration unit 212, the height $H_2$ of the second acoustic cavity 2132 may be 1-300 um. More preferably, the height $H_2$ of the second acoustic cavity 2132 along the vibration direction of the vibration unit 212 may be 1-250 um. More preferably, the height $H_2$ of the second acoustic cavity 2132 along the vibration direction of the vibration unit 212 may be 1-200 um. More preferably, the height $H_2$ of the second acoustic cavity 2132 along the vibration direction of the vibration unit 212 may be 10-200 um. More preferably, the height $H_2$ of the second acoustic cavity 2132 along the vibration direction of the vibration unit 212 may be 20-200 um. More preferably, the height $H_2$ of the second acoustic cavity 2132 along the vibration direction of the vibration unit 212 may be 30-200 um. More preferably, the height $H_2$ of the second acoustic cavity 2132 along the vibration direction of the vibration unit 212 may be 40-200 um. More preferably, the height $H_2$ of the second acoustic cavity 2132 along the vibration direction of the vibration unit 212 may be 50-200 um. More preferably, the height $H_2$ of the second acoustic cavity 2132 along the vibration direction of the vibration unit 212 may be 60-200 um. More preferably, the height $H_2$ of the second acoustic cavity 2132 along the vibration direction of the vibration unit 212 may be 70-200 um. More preferably, the height $H_2$ of the second acoustic cavity 2132 along the vibration direction of the vibration unit 212 may be 80-200 um. More preferably, the height $H_2$ of the second acoustic cavity 2132 along the vibration direction of the vibration unit 212 may be 90-200 um. More preferably, the height $H_2$ of the second acoustic cavity 2132 along the vibration direction of the vibration unit 212 may be 100-200 um. More preferably, the height $H_2$ of the second acoustic cavity 2132 along the vibration direction of the vibration unit 212 may be 120-200 um. More preferably, the height $H_2$ of the second acoustic cavity 2132 along the vibration direction of the vibration unit 212 may be 140-200 um. More preferably, the height $H_2$ of the second acoustic cavity 2132 along the vibration direction of the vibration unit 212 may be 160-200 um. More preferably, the height $H_2$ of the second acoustic cavity 2132 along the vibration direction of the vibration unit 212 may be 180-200 um.

In some embodiments, along the vibration direction of the vibration unit 212, a ratio of the height $H_2$ of the second acoustic cavity 2132 to the height $H_1$ of the first acoustic cavity 2131 may be 10:1. In some embodiments, along the vibration direction of the vibration unit 212, the ratio of the height $H_2$ of the second acoustic cavity 2132 to the height $H_1$ of the first acoustic cavity 2131 may be 9:1. In some embodiments, along the vibration direction of the vibration unit 212, the ratio of the height $H_2$ of the second acoustic cavity 2132 to the height H of the first acoustic cavity 2131 may be 8:1. In some embodiments, along the vibration direction of the vibration unit 212, the ratio of the height $H_2$ of the second acoustic cavity 2132 to the height $H_1$ of the first acoustic cavity 2131 may be 8:1. In some embodiments, along the vibration direction of the vibration unit 212, the ratio of the height $H_2$ of the second acoustic cavity 2132 to the height $H_1$ of the first acoustic cavity 2131 may be 7:1. In some embodiments, along the vibration direction of the vibration unit 212, the ratio of the height $H_2$ of the second acoustic cavity 2132 to the height $H_1$ of the first acoustic cavity 2131 may be 6:1. In some embodiments, along the vibration direction of the vibration unit 212, the ratio of the height $H_2$ of the second acoustic cavity 2132 to the height $H_1$ of the first acoustic cavity 2131 may be 5:1. In some embodiments, along the vibration direction of the vibration unit 212, the ratio of the height $H_2$ of the second acoustic cavity 2132 to the height $H_1$ of the first acoustic cavity 2131 may be 4:1. In some embodiments, along the vibration direction of the vibration unit 212, the ratio of the height $H_2$ of the second acoustic cavity 2132 to the height $H_1$ of the first acoustic cavity 2131 may be 3:1. In some embodiments, along the vibration direction of the vibration unit 212, the ratio of the height $H_2$ of the second acoustic cavity 2132 to the height $H_1$ of the first acoustic cavity 2131 may be 2:1. In some embodiments, along the vibration direction of the vibration unit 212, the ratio of the height $H_2$ of the second acoustic cavity 2132 to the height $H_1$ of the first acoustic cavity 2131 may be 1.5:1. In some embodiments, along the vibration direction of the vibration unit 212, the ratio of the height $H_2$ of the second acoustic cavity 2132 to the height $H_1$ of the first acoustic cavity 2131 may be 2.5:1. In some embodiments, along the vibration direction of the vibration unit 212, the ratio of the height $H_2$ of the second acoustic cavity 2132 to the height $H_1$ of the first acoustic cavity 2131 may be 3.5:1. In some embodiments, along the vibration direction of the vibration unit 212, the ratio of the height $H_2$ of the second acoustic cavity 2132 to the height $H_1$ of the first acoustic cavity 2131 may be 4.5:1. In some embodiments, along the vibration direction of the vibration unit 212, the ratio of the height $H_2$ of the second acoustic cavity 2132 to the height $H_1$ of the first acoustic cavity 2131 may be may be 5.5:1. In some embodiments, along the vibration direction of the vibration unit 212, the ratio of the height $H_2$ of the second acoustic cavity 2132 to the height $H_1$ of the first acoustic cavity 2131 may be 6.5:1. In some embodiments, along the vibration direction of the vibration unit 212, the ratio of the height $H_2$ of the second acoustic cavity 2132 to the height $H_1$ of the first acoustic cavity 2131 may be 7.5:1. In some embodiments, along the vibration direction of the vibration unit 212, the ratio of the height $H_2$ of the second acoustic cavity 2132 to the height $H_1$ of the first acoustic cavity 2131 may be 8.5:1. In some embodiments, along the vibration direction of the vibration unit 212, the ratio of the height $H_2$ of the second acoustic cavity 2132 to the height $H_1$ of the first acoustic cavity 2131 may be 9.5:1.

In some embodiments, the vibration unit 212 may include the mass element 2121 and the elastic element 2122. In some embodiments, the mass element 2121 and the elastic element 2122 may be physically connected by, e.g., glued. Merely by way of example, the elastic element 2122 may be made of material with a certain viscosity, and directly adhered to the mass element 2121. In some embodiments, the elastic element 2122 may be made of a high temperature resistant material, so that the elastic element 2122 maintains its performance during a manufacturing process of the vibration sensor 200. In some embodiments, when the elastic element 2122 is subjected to an environment of 200° C. to 300° C., a Young's modulus and a shear modulus of the elastic element 2122 have no change or very little (e.g., within 5%) change. The Young's modulus may indicate a deformability of the elastic element 2122 when subjected to tension or compression. The shear modulus may indicate the deformability of the elastic element 2122 when subjected to shear. In some embodiments, the material of the elastic element 2122 may be a material with good elasticity (i.e., prone to deform elastically) such that the vibrating unit 212 may vibrate in response to the vibration of the housing 211. Merely by way of example, the material of the elastic element 2122 may include silicone rubber, silicone gel, silicone sealant, or the like, or any combination thereof. In some embodiments, a Shore hardness of the elastic element 2122 may be 1-50 HA. Preferably, the Shore hardness of the elastic element 2122 may be 1-45 HA. More preferably, the Shore hardness of the elastic element 2122 may be 1-40 HA. More preferably, the Shore hardness of the elastic element 2122 may be 1-35 HA. More preferably, the Shore hardness of the elastic element 2122 may be 1-30 HA. More preferably, the Shore hardness of the elastic element 2122 may be 1-35 HA. More preferably, the Shore hardness of the elastic element 2122 may be 1-25 HA. More preferably, the Shore hardness of the elastic element 2122 may be 1-20 HA. More preferably, the Shore hardness of the elastic element 2122 may be 1-15 HA. More preferably, the Shore hardness of the elastic element 2122 may be 1-10 HA. More preferably, the Shore hardness of the elastic element 2122 may be 1-5 HA. More preferably, the Shore hardness of the elastic element 2122 may be 15 HA.

The mass element 2121 may also be referred to as a mass block. In some embodiments, the material of the mass element 2121 may be a material with a density greater than a certain density threshold (e.g., 6 g/cm$^3$), for example, a metal. Merely by way of example, the material of the mass element 2121 may include lead, copper, silver, tin, stainless steel, alloy, or the like, or any combination thereof. Since the higher the density of the material of the mass element 2121, the smaller the size of the mass element 2121. Therefore, the mass element 2121 is made of a material with a density greater than the certain density threshold, which may reduce the size of the vibration sensor 200 to a certain extent. In some embodiments, the density of the material of the mass element 2121 has a large effect on a resonance peak of a frequency response curve and a sensitivity of the vibration sensor 200. Under the same volume, the greater the density of the mass element 2121 is, the greater the mass of the mass element 2121 is, and the resonant peak of the vibration sensor 200 shift to a frequency lower, thereby increasing the sensitivity of the vibration sensor 200. In some embodiments, the density of the material of the mass element 2121 is 6-20 g/cm$^3$. Preferably, the density of the material of the mass element 2121 is 6-15 g/cm$^3$. More preferably, the density of the material of the mass element 2121 is 6-10 g/cm$^3$. More preferably, the density of the material of the mass element 2121 is 6-8 g/cm$^3$. In some embodiments, the mass element 2121 and the elastic element 2122 may be composed of different materials, and assembled (e.g., glued) together to form the vibrating unit 212. In some embodiments, the mass element 2121 and the elastic element 2122 may be composed of the same material, and form the vibrating unit 212 by integrated molding.

In some embodiments, a thickness of the mass element 2121 along its vibration direction may be 50-1000 um. Preferably, the thickness of the mass element 2121 along its vibration direction may be 60-900 um. More preferably, the thickness of the mass element 2121 along its vibration direction may be 70-800 um. More preferably, the thickness of the mass element 2121 along its vibration direction may be 80-700 um. More preferably, the thickness of the mass element 2121 along its vibration direction may be 90-600 um. More preferably, the thickness of the mass element 2121 along its vibration direction may be 100-500 um. More preferably, the thickness of the mass element 2121 along its vibration direction may be 100-400 um. More preferably, the thickness of the mass element 2121 along its vibration direction may be 100-300 um. More preferably, the thickness of the mass element 2121 along its vibration direction may be 100-200 um. More preferably, the thickness of the mass element 2121 along its vibration direction may be 100-150 um.

Figure 3:
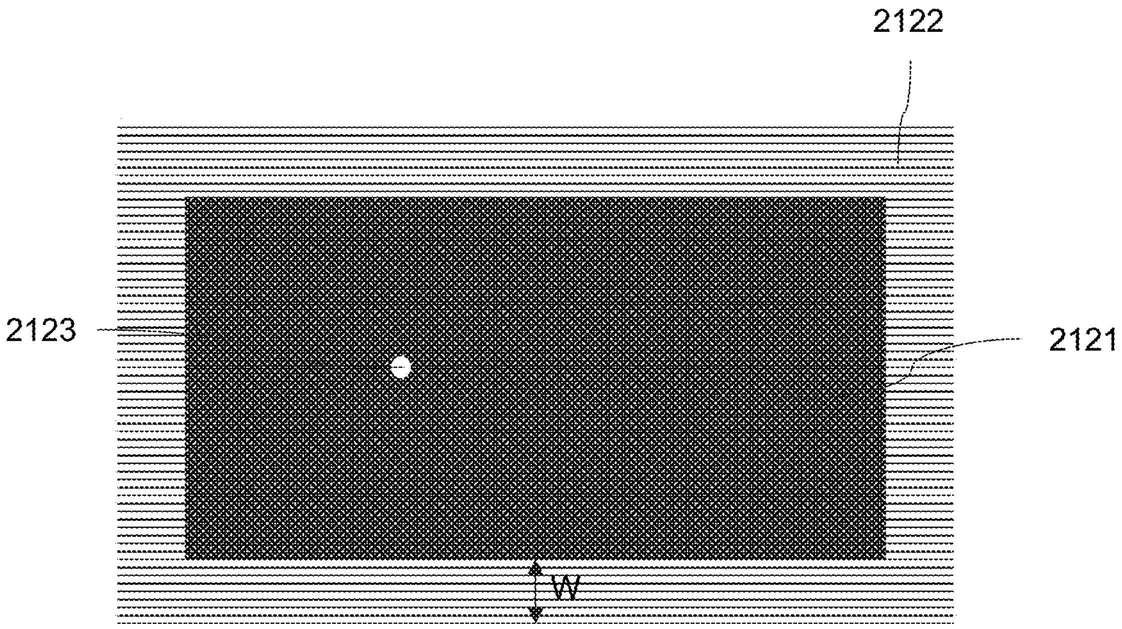
FIG. 3 is a schematic diagram illustrating a connection way between a mass element and an elastic element according to some embodiments of the present disclosure.

In some embodiments, the elastic element 2122 may be connected around the sidewall of the mass element 2121. FIG. 3 is a schematic diagram illustrating a connection way between a mass element and an elastic element according to some embodiments of the present disclosure. As shown in FIGS. 2-4, an inner side 2124 of the elastic element 2122 is connected to the sidewall of the mass element 2121. The inner side 2124 of the elastic element 2122 may refer to a side where a space surrounded by the elastic element 2122 is located. The sidewall of the mass element 2121 may refer to a side of the mass element 2121 that is parallel to the vibration direction. Upper and lower surfaces of the mass element 2121 are approximately perpendicular to the vibration direction and are used to define the second acoustic cavity 2132 and the first acoustic cavity 2131, respectively. Since the elastic element 2122 is connected around the sidewall of the mass element 2121, during the vibration process of the vibrating unit 212 along the vibration direction, a momentum of the mass element 2121 is converted into a force on the elastic element 2122, so that the elastic element 2122 undergoes shear deformation. Compared to the tensile and compressive deformations, the shear deformation reduces spring coefficients of the elastic element 2122, which reduces the resonant frequency of the vibration sensor 200, thereby increasing a vibration amplitude of the mass element 2121 during the vibration of the vibration unit 212, and improving the sensitivity of the vibration sensor 200.

In some embodiments, the mass element 2121 and the elastic element 2122 in the vibration unit 212 may be considered as an additional resonant system other than the resonant system of the acoustic transducer 220. In some embodiments, the additional resonant system may adjust an original vibration characteristic of the vibration sensor 200 (i.e., a vibration characteristic under an action of the original resonant system of the acoustic transducer 220) so that the original resonant frequency of the vibration sensor 200 (i.e., a resonant frequency under the action of the original resonant system of the acoustic transducer 220) is varied. In such cases, the above setting may be regarded as introducing a new resonant system to the original resonant system of the vibration sensor 200, thereby introducing an additional resonant peak. The resonant frequency of the additional resonant peak is less than the resonant frequency of the acoustic transducer 220, so that a sensor device 200 has a higher sensitivity. Detailed descriptions regarding the sensitivity of the sensor device 200 may be found in FIGS. 6-8 and the detailed descriptions thereof.

In some embodiments, a resonant frequency of the vibration sensor 200 may be 1000 Hz-5000 Hz. Preferably, the resonant frequency of the vibration sensor 200 may be 1500 Hz-5000 Hz. More preferably, the resonant frequency of the vibration sensor 200 may be 2000 Hz-5000 Hz. More preferably, the resonant frequency of the vibration sensor 200 may be 2500 Hz-5000 Hz. More preferably, the resonant frequency of the vibration sensor 200 may be 3000 Hz-5000 Hz. More preferably, the resonant frequency of the vibration sensor 200 may be 3500 Hz-5000 Hz. More preferably, the resonant frequency of the vibration sensor 200 may be 4000 Hz-5000 Hz. More preferably, the resonant frequency of the vibration sensor 200 may be 3000 Hz-5000 Hz. More preferably, the resonant frequency of the vibration sensor 200 may be 4000 Hz-5000 Hz. More preferably, the resonant frequency of the vibration sensor 200 may be 4500 Hz-5000 Hz. More preferably, the resonant frequency of the vibration sensor 200 may be 1000 Hz-4500 Hz. More preferably, the resonant frequency of the vibration sensor 200 may be 1000 Hz-4000 Hz. More preferably, the resonant frequency of the vibration sensor 200 may be 1500 Hz-4500 Hz. More preferably, the resonant frequency of the vibration sensor 200 may be 2000 Hz-4000 Hz. More preferably, the resonant frequency of the vibration sensor 200 may be 2000 Hz-3500 Hz. More preferably, the resonant frequency of the vibration sensor 200 may be 2000 Hz-3000 Hz. More preferably, the resonant frequency of the vibration sensor 200 may be 2000 Hz-2500 Hz. In some embodiments, the resonant frequency of the vibration sensor 200 may be determined by parameters of the mass element 2121 and the elastic element 2122. In some embodiments, the parameters used to determine the resonant frequency may include, but are not limited to, a mass of the mass element 2121, a mass of the elastic element 2122, a stiffness of the elastic element 2122, a Young's modulus of the elastic element 2122, a shear modulus of the elastic element 2122, an equivalent stiffness of the elastic element 2122, or a spring coefficient of the elastic element 2122. In some embodiments, by adjusting the parameters of the mass element 2121 and the elastic element 2122, the vibration sensor 200 may have different resonant frequencies. For example, when the mass of the mass element 2121 is constant, the smaller the spring coefficient of the elastic element 2122 is, the lower the resonant frequency of the vibration sensor 200.

In some embodiments, a shape of the elastic element 2122 may be adapted to a shape of the mass element 2121. For example, the elastic element 2122 may be a tubular structure that has an open end having a same cross-sectional shape as that of the mass element 2121 in the plane perpendicular to the vibration direction of the mass element 2121. The open end of the elastic element 2122 may be an end connected to the mass element 2121. As shown in FIG. 3, the cross-sectional shape of the mass element 2121 in the plane perpendicular to the vibration direction of the mass element 2121 is quadrilateral, and an area surrounded by the elastic element 2122 is tubular, and the tubular area which has a quadrilateral hole in the plane perpendicular to the vibration direction of the mass element 2121. Merely by way of example, the cross-sectional shape of the mass element 2121 in the plane perpendicular to the vibration direction of the mass element 2121 may include a regular shape (e.g., circular, elliptical, scalloped, rounded rectangular, polygonal) and an irregular shape, etc. Accordingly, the shape of the tubular area surrounded by the elastic element 2122 in the plane perpendicular to the vibration direction of the mass element 2121 may include a regular shape or irregular shape. A shape of an outer side 2125 of the tubular elastic element 2122 is not limited in the present disclosure. The outer side 2125 of the elastic element 2122 may be a side opposite to the inner side 2124 of the elastic element 2122. For example, the shape of the outer side of the tubular elastic element 2122 may include cylindrical, elliptical cylindrical, conical, rounded rectangular column, rectangular column, polygonal column, irregular column, or the like, or any combination thereof. As shown in FIG. 3, the shape of the outer side of the tubular elastic element 2122 may be quadrilateral.

In some embodiments, as shown in FIG. 3, a width W of the elastic element 2122 connected around the sidewall of the mass element 2121 from one side close to the mass element 2121 to the other side away from the mass element 2121 may be 10-500 um. Preferably, the width W of the elastic element 2122 from one side close to the mass element 2121 to the other side away from the mass element 2121 may be 20-450 um. More preferably, the width W of the elastic element 2122 from one side close to the mass element 2121 to the other side away from the mass element 2121 may be 30-400 um. More preferably, the width W of the elastic element 2122 from one side close to the mass element 2121 to the other side away from the mass element 2121 may be 40-350 um. More preferably, the width W of the elastic element 2122 from one side close to the mass element 2121 to the other side away from the mass element 2121 may be 50-300 um. More preferably, the width W of the elastic element 2122 from one side close to the mass element 2121 to the other side away from the mass element 2121 may be 60-250 um. More preferably, the width W of the elastic element 2122 from one side close to the mass element 2121 to the other side away from the mass element 2121 may be 70-200 um. More preferably, the width W of the elastic element 2122 from one side close to the mass element 2121 to the other side away from the mass element 2121 may be 80-150 um. More preferably, the width W of the elastic element 2122 from one side close to the mass element 2121 to the other side away from the mass element 2121 may be 90-100 um.

Figure 4A:
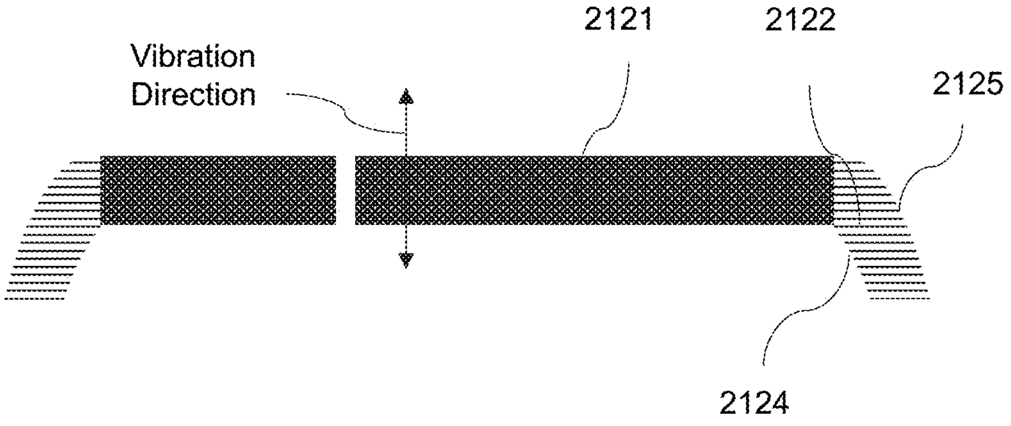
FIG. 4A is a schematic diagram illustrating a vibration unit according to some embodiments of the present disclosure.
Figure 4B:
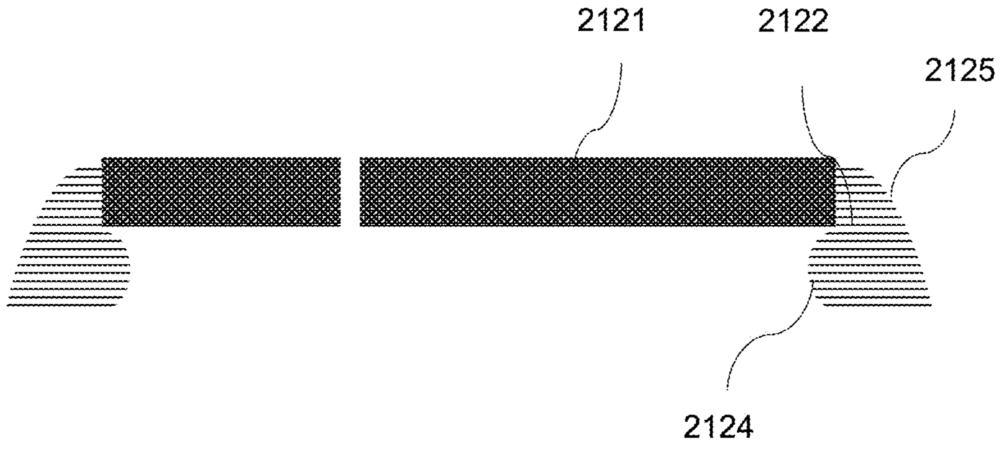
FIG. 4B is a schematic diagram illustrating a vibration unit according to some embodiments of the present disclosure.
Figure 4C:
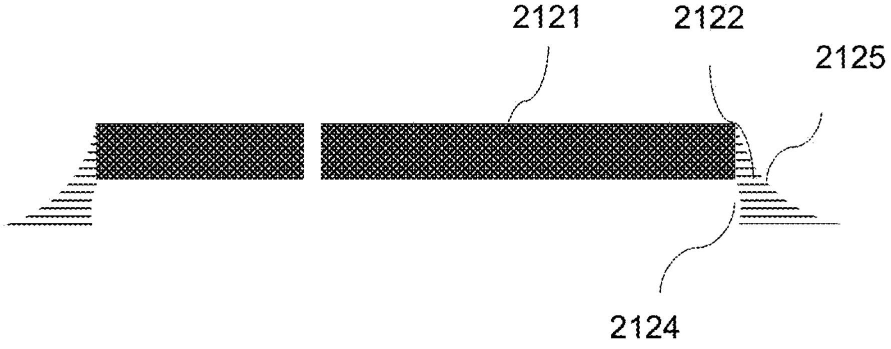
FIG. 4C is a schematic diagram illustrating a vibration unit according to some embodiments of the present disclosure.

In some embodiments, the width W of the elastic element 2122 from one side close to the mass element 2122 to the other side away from the mass element 2122 is variable along the vibration direction. That is, the elastic element 2122 may include a plurality of cross-sections perpendicular to the vibration direction, the width of the elastic element 2122 in each section is a length of the section along a direction perpendicular to a boundary of the elastic element 2122, and the widths of the elastic element 2122 in the plurality of cross-sections may be different. As shown in FIGS. 4A-4B, the elastic element 2122 may bulge outward and/or inward relative to the mass element 2121. As described in the present disclosure, the outward bulging of the elastic element 2122 relative to the mass element 2121 indicates that a distance between at least a partial area of the outer side 2125 of the elastic element 2122 and an axis (e.g., Z axis as shown in the figure) of the first acoustic cavity 2131 gradually increases along a direction from the mass element 2121 to the acoustoelectric transducer element. The inward bulging of the elastic element 2122 relative to the mass element 2121 indicates that the distance between the at least a partial area of the inner side 2124 of the elastic element 212 and the axis of the first acoustic cavity 2131 gradually decreases along the direction from the mass element 2121 to the acoustoelectric transducer element. The axis (e.g., the Z-axis as shown in the figure) of the first acoustic cavity 2131 may refer to a geometric centerline of the first acoustic cavity 2131 parallel to the vibration direction. This outward and/or inward bulging may cause that the width W of the elastic element 2122 from one side close to the mass element 2122 to the other side away from the mass element 2122 is variable along the vibration direction of the mass element 2121. For example, as shown in FIG. 4B, due to inward bulging, a width of a portion of the elastic element 2122 away from the mass element 2121 is greater than a width of a portion of the elastic element 2122 close to the mass element 2121. The variation of the width of the elastic element 2122 may be denoted as a difference between a minimum width value and a maximum width value of the elastic element 2122. In some embodiments, the variation of the width may be less than or equal to 300 um. In some embodiments, the variation of the width may be less than or equal to 250 um. In some embodiments, the variation of the width may be less than or equal to 200 um. In some embodiments, the variation of the width may be less than or equal to 150 um. In some embodiments, the variation of the width may be less than or equal to 100 um. In some embodiments, the variation of the width may be less than or equal to 50 um. In some embodiments, the variation of the width may be less than or equal to 30 um. In some embodiments, the width of the elastic element 2122 may remain constant, i.e., the variation of the width may be 0. In some embodiments, as shown in FIG. 4C, the elastic element 2122 may be recessed outward and/or inward relative to the mass element 2121. As described in the present disclosure, the outward recess of the elastic element 2122 relative to the mass element 2121 indicates that the distance between the at least a partial area of the inner side 2124 of the elastic element 2122 and the axis (e.g., Z axis as shown in the figure) of the first acoustic cavity 2131 first gradually decreases and then gradually increases along the direction from the mass element 2121 to the acoustoelectric transducer element. The inward recess of the elastic element 2122 relative to the mass element 2121 indicates that the distance between the at least a partial area of the outer area 2125 of the elastic element 212 and the axis of the first acoustic cavity 2131 first gradually decreases and then gradually increases along the direction from the mass element 2121 to the acoustoelectric transducer element. For example, the outer side 2125 of the elastic element 2122 may be recessed inward and the inner side 2124 of the elastic element 2122 may be recessed outward. As another example, the outer side 2125 of the elastic element 2122 may be recessed inward and the inner side 2124 of the elastic element 2122 may be bulged outward.

In some embodiments, as shown in FIG. 2, a surface A of the elastic element 2122 away from the acoustic transducer 220 (i.e., an upper surface of the elastic element 2122, the upper surface of the elastic element 2122 is a surface of the elastic element 2122 away from the acoustic transducer 220) may be lower than a surface B of the mass element 2121 away from the acoustic transducer 220 (i.e., a upper surface of the mass element 2121, the upper surface of the mass element 2121 is a surface of the mass element 2121 away from the acoustic transducer 220). Usually, since the elastic element 2122 is an elastic colloid, during a preparation process of the vibration unit 212, due to operational reasons, the elastic element 2122 may overflow to the surface B of the mass element 2121, which may affect the packaging of the housing 211 (even resulting in the housing 211 being unpackable), which results in a change in the volume of the second acoustic cavity 2132 and an increase in an equivalent stiffness of the elastic element 2122, thereby reducing the performance (e.g., sensitivity) of the vibration sensor 200. The equivalent stiffness of the elastic element 2122 may be a parameter that indicates a total deformation (e.g., including the tensile and compressive deformations and the shear deformation) of the elastic element 2122. In some embodiments, a height difference between the surface A of the elastic element 2122 away from the acoustic transducer 220 and the surface B of the mass element 2121 away from the acoustic transducer 220 may be less than ⅔ of the thickness of the mass element 2121. Preferably, the height difference between the surface A of the elastic element 2122 away from the acoustic transducer 220 and the surface B of the mass element 2121 away from the acoustic transducer 220 may be less than ½ of the thickness of the mass element 2121. More preferably, the height difference between the surface A of the elastic element 2122 away from the acoustic transducer 220 and the surface B of the mass element 2121 away from the acoustic transducer 220 may be less than ⅓ of the thickness of the mass element 2121.

Figure 5:
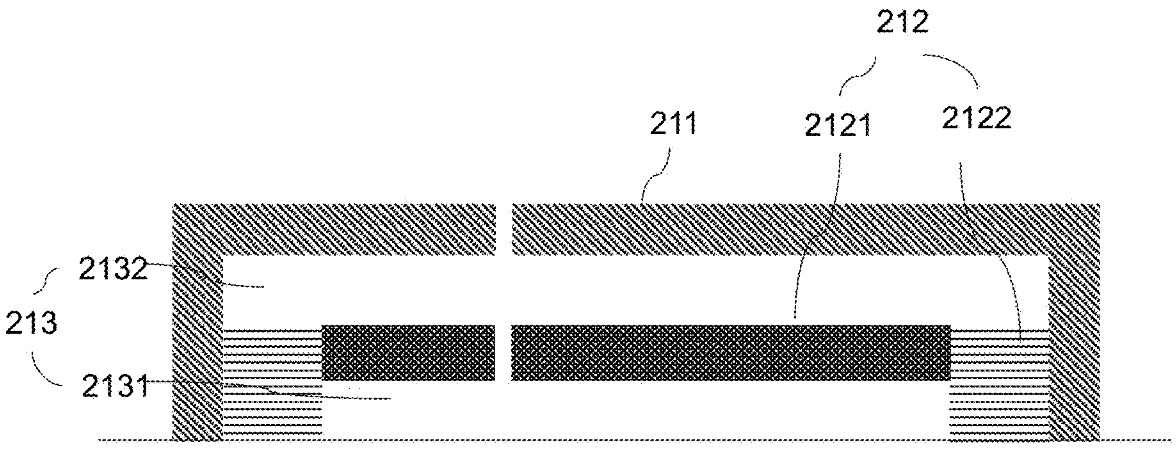
FIG. 5 is a schematic diagram illustrating a vibration receiver according to some embodiments of the present disclosure.

In some embodiments, the elastic element 2121 may extend to the acoustic transducer 220 and be connected to the acoustic transducer 220 directly or indirectly. For example, as shown in FIG. 2, an end of the elastic element 2121 extending toward the acoustic transducer 220 may be directly connected to the acoustic transducer 220. The connection between the elastic element 2121 and the acoustic transducer 220 may be a physical connection by, for example, a gluing. In some embodiments, the elastic element 2121 may be in direct contact with or spaced from the housing 211. For example, as shown in FIG. 2, an interval may exist between the elastic element 2121 and the housing 211. A size of the interval may be adjusted by a designer according to a size of the vibration sensor 200. As another example, FIG. 5 is a schematic diagram illustrating a vibration receiver 210 according to some embodiments of the present disclosure. As shown in FIG. 5, the elastic element 2121 may be in direct contact with the housing 211, which may, on one hand, reduce a flow of the elastic element 2121 during the preparation process of the vibration receiver 212 to better control the size and shape of the elastic element, and on the other hand, reduce the size of the vibration sensor 200. Compared with the direct contact between the elastic element 2121 and the housing 21, although the interval between the elastic element 2121 and the housing 211 may increase the size of the vibration sensor 200, the interval reduces the equivalent stiffness of the elastic element 2121 and increase the elasticity of the elastic element 2121, which may increase the vibration amplitude of the mass element 2121 during the vibration process of the vibration unit 212, thereby reducing the resonant frequency of the vibration sensor 200 and improving the sensitivity of the vibration sensor 200.

In some embodiments, at least one of the housing 211 or the mass element 2121 may be provided with at least one pressure relief hole. As shown in FIG. 2 and FIG. 5, the housing 211 may be provided with at least one pressure relief hole 2111. The pressure relief hole 2111 may pass through the housing 211. As shown in FIGS. 2-5, the mass element 2121 may be provided with at least one pressure relief hole 2123. The pressure relief hole 2123 may pass through the mass element 2121. The pressure relief hole 2123 may allow the gas in the first acoustic cavity 2131 to communicate with the second acoustic cavity 2132, and the pressure relief hole 2111 may allow the gas in the second acoustic cavity 2132 to communicate with the outside, which balances the change of air pressure inside the first acoustic cavity 2131 and the second acoustic cavity 2332 caused by a temperature change during the preparation process (e.g., a reflow soldering) of the vibration sensor 200, thereby reducing or preventing damages such as cracking, deformation, etc. to the components of the vibration sensor 200 caused by the air pressure change. In some embodiments, the housing 211 may be provided with at least one pressure relief hole 2111, which may reduce a damping generated by gas inside the second acoustic cavity 2332 when the mass element 2121 vibrates.

In some embodiments, the pressure relief hole 2111 and/or the pressure relief hole 2123 may be a single hole. In some embodiments, a diameter of the single hole may be 1-50 um. Preferably, the diameter of the single hole may be 2-45 um. More preferably, the diameter of the single hole may be 3-40 um. More preferably, the diameter of the single hole may be 4-35 um. More preferably, the diameter of the single hole may be 5-30 um. More preferably, the diameter of the single hole may be 5-25 um. More preferably, the diameter of the single hole may be 5-20 um. More preferably, the diameter of the single hole may be 6-15 um. More preferably, the diameter of the single hole may be 7-10 um. In some embodiments, the pressure relief hole 2111 and/or the pressure relief hole 2123 may be an array of a certain number of micro-holes. Merely by way of example, the number of micropores may be 2-10. In some embodiments, the diameter of each micropore may be 0.1-25 um. Preferably, the diameter of the each micropore may be 0.5-20 um. More preferably, the diameter of each micropore may be 0.5-25 um. More preferably, the diameter of the each micropore may be 0.5-20 um. More preferably, the diameter of the each micropore may be 0.5-15 um. More preferably, the diameter of the each micropore may be 0.5-10 um. More preferably, the diameter of the each micropore may be 0.5-5 um. More preferably, the diameter of the each micropore may be 0.5-4 um. More preferably, the diameter of the each micropore may be 0.5-3 um. More preferably, the diameter of the each micropore may be 0.5-2 um. More preferably, the diameter of the each micropore may be 0.5-1 um.

In some embodiments, the air conduction sound in the environment may affect the usage performance of the vibration sensor 200. To reduce the effect of the air conduction sound, the at least one pressure relief hole 2111 in the housing 211 may be sealed with a sealing material after the preparation of the vibration sensor 200 is complete, e.g., after the reflow soldering. Merely by way of example, the sealing material may include an epoxy adhesive, a silicone sealant, or the like, or any combination thereof.

In some embodiments, the pressure relief hole may not be provided in the housing 211 and the mass element 2121. In some embodiments, when the pressure relief hole is not provided in the housing 211 and mass element 2121, a connection strength between the components of the vibration sensor 200 may be increased (e.g., increasing the connection strength of the glue connecting the components) to avoid the damage to the components of the vibration sensor 200 caused by the air pressure change inside the first acoustic cavity 2131 and the second acoustic cavity 2332.

The vibration sensor 200 may convert an external vibration signal into an electrical signal. Merely by way of example, the external vibration signal may include the vibration signal generated when a person speaks, the vibration signal generated by the skin moving with the human body or other devices (such as speakers) close to the skin, vibration signal generated by an object or air in contact with the vibration sensor 200, or the like, or any combination thereof. When the vibration sensor 200 is operating, the external vibration signal may be transmitted to the vibration unit 212 through the housing 211. The mass element 2121 of the vibration unit 212 is driven by the elastic element 2122 to vibrate in response to the vibration of the housing 211. The vibration of the mass element 2121 may cause a volume change of the first acoustic cavity 2131, thereby causing the change of the air pressure in the first acoustic cavity 2131, and the change of the air pressure in the cavity is converted into the change of the acoustic pressure within the first acoustic cavity 2131. The acoustic transducer 220 may detect the change of the acoustic pressure in the first acoustic cavity 2131 and convert the change of the acoustic pressure to the electrical signal. For example, the acoustic transducer 220 may include an air inlet 221, and the change of the acoustic pressure in the first acoustic cavity 2131 may act on a diaphragm of the acoustic transducer 220 through the air inlet 221, so that the diaphragm vibrates (or deforms) to generate the electrical signal. Further, the electrical signal generated by the acoustic transducer 220 may be transmitted to an external electronic device. Merely by way of example, as shown in FIG. 2, the acoustic transducer 220 may include an interface 222. The interface 222 may be wired (e.g., electrically connected) or wirelessly connected to an internal element (e.g., a processor) of the external electronic device. The electrical signal generated by the acoustic transducer 220 may be transmitted to the external electronic device through the interface 222 in a wired or wireless manner. In some embodiments, the external electronic device may include a mobile device, a wearable device, a virtual reality device, an augmented reality device, or the like, or any combination thereof. In some embodiments, the mobile device may include a smartphone, a tablet, a personal digital assistant (PDA), a gaming device, a navigation device, or the like, or any combination thereof. In some embodiments, the wearable device may include a smart bracelet, a headphone, a hearing aid, a smart helmet, a smart watch, smart clothing, a smart backpack, a smart accessory, or the like, or any combination thereof. In some embodiments, the virtual reality device and/or the augmented reality device may include a virtual reality headphone, a virtual reality glasses, a virtual reality patch, an augmented reality headphone, an augmented reality glasses, an augmented reality patch, or the like, or any combination thereof. For example, the virtual reality device and/or the augmented reality device may include Google Glass, Oculus Rift, Hololens, Gear VR, etc.

It should be noted that the above descriptions of the vibration sensor 200 and the components thereof are merely provided for the purposes of illustration, and not intended to limit the scope of the present disclosure. For those skilled in the art, various amendments and variations may be made to the vibration sensor 200 under the teachings of the present disclosure. In some embodiments, the elastic element 2122 may be provided with the at least one pressure relief hole. The pressure relief hole may pass through the elastic element 2122. These amendments and variations do not depart from the scope of the present disclosure.

Figure 6:
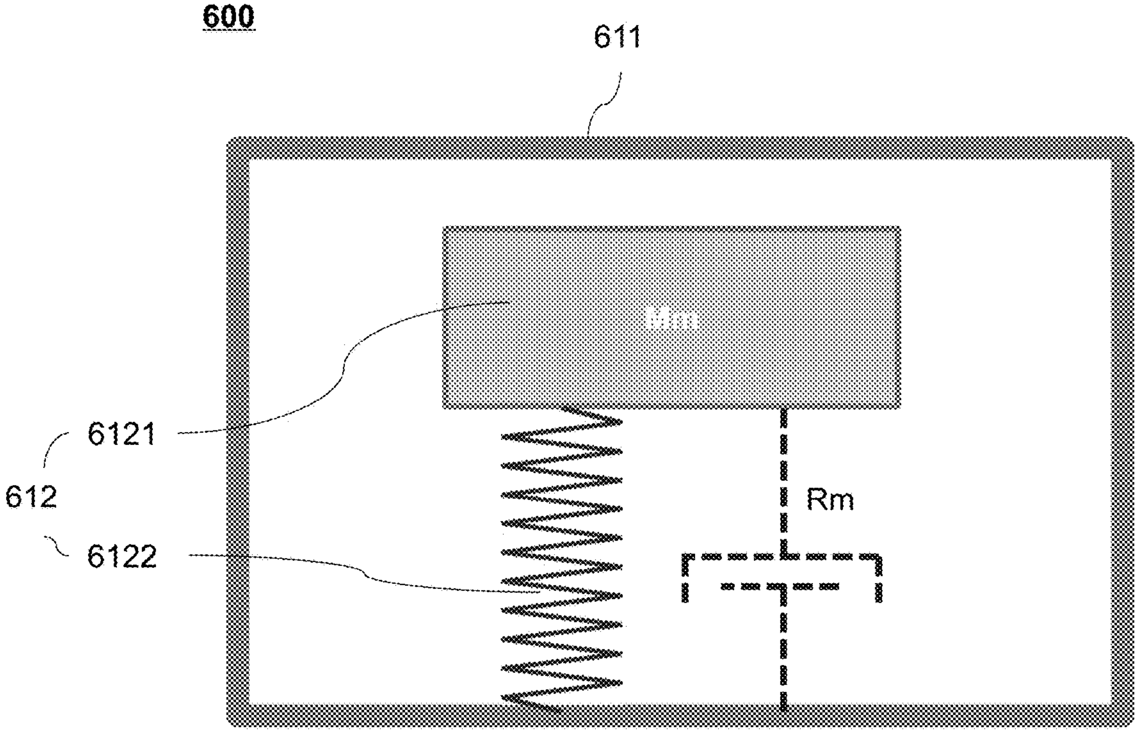
FIG. 6 is a schematic diagram illustrating a simplified structure of a vibration system according to some embodiments of the present disclosure.

FIG. 6 is a schematic diagram illustrating a simplified structure of a vibration system 600 according to some embodiments of the present disclosure. The vibration receiver shown in FIGS. 1-5 may be described by the vibration system 600. As shown in FIG. 6, the vibration system 600 may include a housing 611 that forms a closed cavity and a vibration unit 612 located in the closed cavity. The vibration unit 612 may include a mass element 6121 and an elastic element 6122. The elastic element 6122 may be connected between the mass element 6121 and the housing 611. In some embodiments, the elastic element 6122 may be a spring. For the convenience of description, the mass of the housing 611 may be denoted as m, the mass of the mass element 6121 may be denoted as $M_m$, the mass of the elastic element 6122 may be denoted as $K_m$, and a damping of the system may be denoted as $R_m$.

A displacement of the housing 611 during vibration is set as $\xi_1$ denoted as:

$$\xi_1=\xi_{10}*e^{i*\omega*t} \tag{1}$$

where $\xi_{10}$ refers to a vibration amplitude of the housing 611 during vibrating, i refers to an imaginary unit, ω refers to a vibration frequency of the housing 611 during vibrating, and t refers to a vibration time of the housing 611 during vibrating. A motion equation of the mass element 6121 may be denoted as:

$$M_m\frac{\partial^2\xi_2}{\partial t^2}+R_m\left(\frac{\partial\xi_2}{\partial t}-\frac{\partial\xi_1}{\partial t}\right)+K_m(\xi_2-\xi_1)=0, \tag{2}$$

where $\xi_2$ refers to a displacement of the mass element 6121 during vibrating.

A relative displacement between mass element 6121 and housing 611 is $\xi=\xi_1-\xi_2$, and a magnitude $\xi_a$ of the relative displacement may be denoted as:

$$\xi a=\frac{M_m*a_{10}}{\omega*\mathrm{Abs}[Z_m]}, \tag{3}$$

where $a_{10}$ refers to an acceleration amplitude of the housing 611, a force resistance modulus $Z_m=\sqrt{R_m^2+X_m^2}$, a force resistance $$X_m=\omega*M_m-\frac{K_m}{\omega},$$

and Abs is a absolute value function.

A vibration amplitude Δh of the mass element 6121 relative to the housing 611 at unit acceleration may be denoted as:

$$\Delta h=\xi_a/a_{10}=\frac{M_m}{\omega\sqrt{\mathrm{Abs}\left[R_m^2+\left(-\frac{K_m}{\omega}+M_m\omega\right)^2\right]}}. \tag{4}$$

Let $K_m=\omega_0^2*M_m$, $\omega_0$ is the resonant frequency of the vibrating system 600, we can get:

$$\Delta h=\xi_a/a_{10}=\frac{M_m}{\omega\sqrt{\mathrm{Abs}\left[R_m^2+\left(M_m\omega-\frac{M_m\omega_0^2}{\omega}\right)^2\right]}}. \tag{5}$$

For the sensitivity of the vibration system 600 in a flat area of a frequency response curve of the vibration system 600, the $\omega \ll \omega_0$, and for the convenience of calculation, ω=1, then the vibration amplitude of the mass element 6121 in a low frequency range (e.g., the flat area of the frequency response curve) may be denoted as:

$$\Delta h=\frac{M_m}{\sqrt{\mathrm{Abs}\left[R_m^2+M_m^2\left(1-\omega_0^2\right)^2\right]}}. \tag{6}$$

In the practical application of the vibration system 600, $\omega_0 \ll 1$, then the vibration amplitude of the mass element 6121 in the low frequency range in the practical application of the vibration system 600 may be denoted as:

$$\Delta h=\frac{M_m}{\sqrt{\mathrm{Abs}\left[R_m^2+M_m^2\omega_0^4\right]}}. \tag{7}$$

The quality factor $$Q_m=\frac{\omega_0M_m}{R_m}$$

is put into equation (7), the vibration amplitude of the mass element 6121 in the low frequency range may be denoted as $$\Delta h=\frac{1}{\omega_0\sqrt{\omega_0^2+\frac{1}{Q_m}}}. \tag{8}$$

The sensitivity of the vibration system 600 in the flat area of the frequency response curve is mainly related to the resonant frequency $\omega_0$ of the vibration system 600, and is almost negligibly affected by the quality factor $Q_m$. Therefore, the vibration amplitude of the mass element 6121 relative to the housing 611 in the low frequency range (e.g., in the flat area of the frequency response curve) under unit acceleration may be denoted as:

$$\Delta h \approx \frac{1}{\omega_0^2}. \tag{9}$$

From equation (9), the vibration amplitude of the mass element 6121 is inversely proportional to a square of the resonant frequency of the vibration system 600, which is applied to other embodiments in the present disclosure, for example, the vibration sensor 200 shown in FIG. 2, the vibration amplitude of the mass element 2121 is inversely proportional to the square of the resonant frequency of the vibration sensor 200. Further, it can be seen from Equation (9) that, for a mechanical system (e.g., the vibration sensor 100, the vibration sensor 200, the vibration system 600), the lower the resonant frequency, the greater the vibration amplitude of the center of gravity of the mass element (e.g., the mass element 2121, the mass element 6121) at the low frequency range (e.g., the flat area of the frequency response curve of the mechanical system), and the higher the sensitivity. In some embodiments, the low frequency range may be a frequency band less than 2000 Hz, 1000 Hz, 800 Hz, 600 Hz, or 500 Hz. Similarly, the greater the vibration amplitude of the center of gravity of the mass element of the mechanical system at the low frequency range (e.g., the flat area of the frequency response curve of the mechanical system), the lower the resonant frequency of the mechanical system, and the higher the sensitivity.

Therefore, in the present disclosure, according to the descriptions in FIG. 2, the elastic element (e.g., the elastic element 2122) is connected around the sidewall of the mass element (e.g., the mass element 2121), and the elastic element undergoes the shear deformation during the vibration process of the vibration unit (e.g., the vibration unit 212). Compared to the tensile and compressive deformations, the shear deformation reduces the spring coefficient of the elastic element and the resonant frequency of the vibration sensor (e.g., the vibration sensor 200), thereby increasing the vibration amplitude of the mass element during the vibration process of the vibration unit and the sensitivity of the vibration sensor.

Further, in the present disclosure, according to the descriptions in FIG. 2, there is an interval between the elastic element and the housing (e.g., the housing 211), which reduces the stiffness of the elastic element and increases the elasticity of the elastic element, thereby increasing the vibration amplitude of the mass element during the vibration process of the vibration unit, and accordingly reducing the resonant frequency of the vibration sensor and increasing the sensitivity of the vibration sensor.

The resonant frequency of the vibration system 600 may be determined by the mass $M_m$ of the mass element 6121, the mass $K_m$ of the elastic element 6122, and the damping $R_m$ of the system. The damping $R_m$ of the system is positively correlated with the resonant frequency of the vibration system 600. The mass $M_m$ of the mass element 6121 and the mass $K_m$ of the elastic element 6122 is negatively correlated with the resonant frequency of the vibration system 600. In addition, it can be seen from Equation (9), for mechanical systems (e.g., the vibration sensor 100, the vibration sensor 200, the vibration system 600) with the same resonant frequency, the vibration amplitudes of the center of gravity of the mass elements (e.g., the mass element 2121, the mass element 6121) of the mechanical systems at the low frequency range (e.g., the flat area of the frequency response curve of the mechanical system) are approximately the same. For the mechanical systems in which the vibration amplitudes of the center of gravity of the mass elements are approximately the same at the low frequency range, a detailed description regarding how to improve the sensitivity of the mechanical systems by arranging structures and/or parameters of components of the mechanical systems may be found in FIGS. 7-8 and the descriptions thereof.

Figure 7:
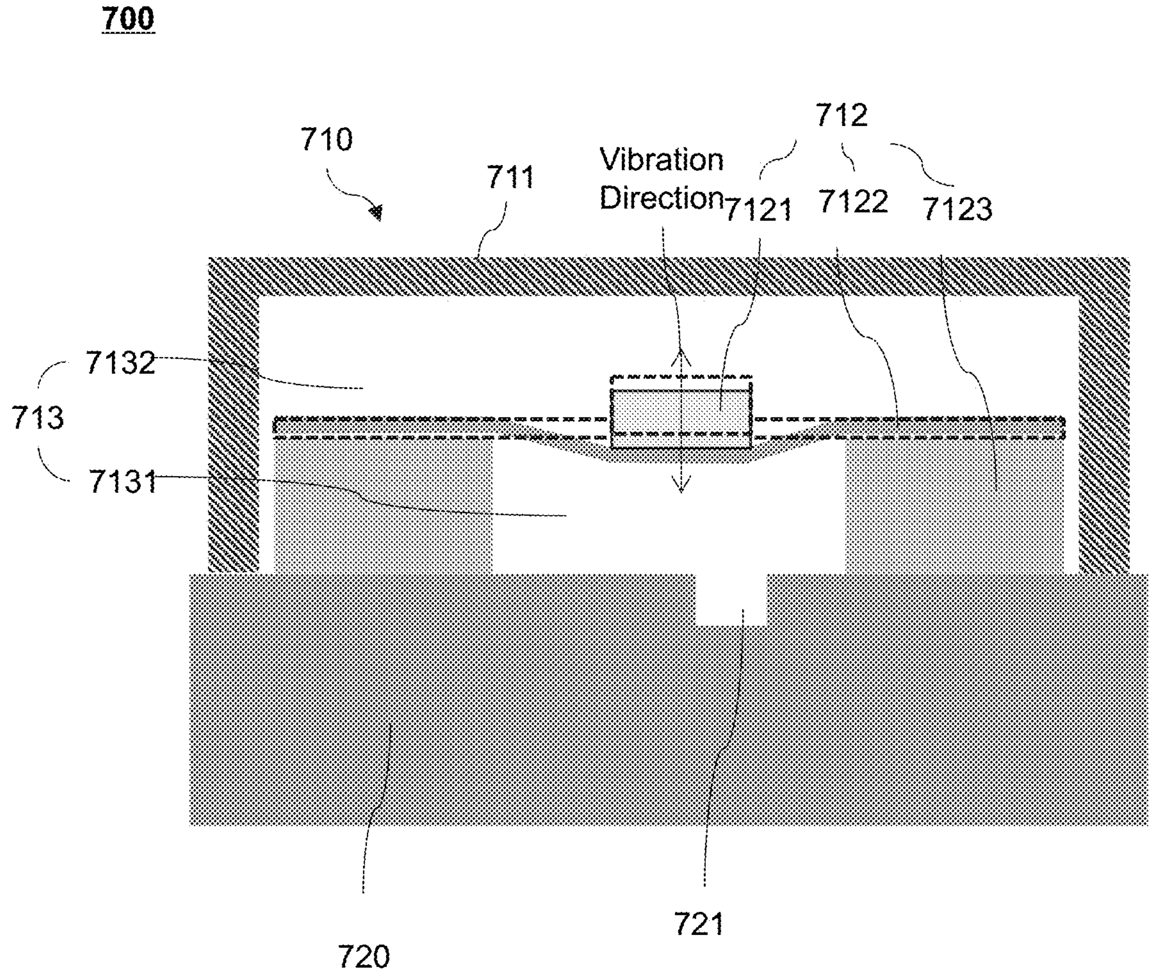
FIG. 7 is a schematic diagram illustrating a structure of a vibration sensor according to some embodiments of the present disclosure.

FIG. 7 is a schematic diagram illustrating a structure of a vibration sensor 700 according to some embodiments of the present disclosure. As shown in FIG. 7, the vibration sensor 700 may include a vibration receiver 710 and an acoustic transducer 720. The vibration receiver 710 may include a housing 711 and a vibration unit 712. The housing 711 may be connected to the acoustic transducer 720 to form a package structure having an acoustic cavity 713. The vibration unit 712 may be located in the acoustic cavity 713 of the package structure and divide the acoustic cavity 713 into a first acoustic cavity 7131 and a second acoustic cavity 7132. The vibration unit 712 may include a mass element 7121, an elastic film 7122, and a supporting assembly 7123. As shown in FIG. 7, the mass element 7121 may be located on an upper surface of the elastic film 7122. In some embodiments, the material of the elastic film 7122 may include a polymeric elastic film such as a polytetrafluoroethylene (PTFE) film, a polydimethylsiloxane (PDMS) film, or a composite film (e.g., a composite film formed by a plastic film (e.g., polyethylene (PE), polypropylene (PP), polystyrene (PS), polyvinyl chloride (PVC), and polyester (PET), etc.), a cellophane, a paper, and/or a metal foil AL, etc.). The supporting assembly 7123 may be configured to support the elastic film 7122. As shown in FIG. 7, the supporting portion 7123 is fixed to an end of the supporting assembly 450, and the other end of the supporting assembly 450 is connected to the acoustic transducer 720.

It should be noted that, as shown in FIG. 7, the mass element 7121 is arranged above the first acoustic cavity 7131 by the elastic film 7122, and a cross-sectional area of the mass element 7121 perpendicular to a vibration direction of the mass element 7121 is less than a cross-sectional area of the first acoustic cavity 7131 perpendicular to the vibration direction of the mass element 7121. Merely by way of example, the cross-sectional area of the mass element 7121 perpendicular to the vibration direction of the mass element 7121 is less than or equal to ⅔ of the cross-sectional area of the first acoustic cavity 7131 perpendicular to the vibration direction of the mass element 7121. The cross-sectional area of the mass element 7121 perpendicular to the vibration direction of the mass element 7121 is less than or equal to ⅓ of the cross-sectional area of the first acoustic cavity 7131 perpendicular to the vibration direction of the mass element 7121.

A sensitivity of the vibration sensor 700 may be proportional to a ratio of an air pressure change of the first acoustic cavity 7131 to an initial air pressure of the first acoustic cavity 712 or a ratio of a volume change of the first acoustic cavity 7131 to an initial volume of the first acoustic cavity 7131. In other words, the sensitivity of the vibration sensor 700 may be denoted as:

$$s \propto \frac{\Delta p}{p_0} = \frac{\Delta V}{V_0}, \tag{10}$$

where $\Delta p$ refers to the air pressure change of the first acoustic cavity 7131, $p_0$ refers to the initial air pressure of the first acoustic cavity 7131, the $\Delta V$ refers to the volume change of the first acoustic cavity 7131, and $V_0$ refers to the initial volume of the first acoustic cavity 7131. In some embodiments, the acoustic transducer 720 may include at least one air inlet 721, and the initial volume $V_0$ of the first acoustic cavity 7131 includes the volume of the at least one air inlet 721.

As shown in FIG. 7, since the cross-sectional area of the mass element 7121 perpendicular to the vibration direction of the mass element 7121 is less than the cross-sectional area of the first acoustic cavity 7131 perpendicular to the vibration direction of the mass element 7121, the vibration of the mass element 7121 up and down along the vibration direction would cause the elastic film 7122 to deform, thereby causing the volume change of the first acoustic cavity 7131. A shape of the volume change of the first acoustic cavity 7131 caused by the deformation of the elastic film 7122 may be approximated as a prism, and accordingly, the volume change ΔV of the first acoustic cavity 7131 may be denoted as:

$$\Delta V \approx \frac{1}{3}\Delta h\left(A_1 + A_0 + \sqrt{A_1 A_0}\right), \tag{11}$$

where Δh refers to the vibration amplitude of the mass element 7121, $A_1$ refers to the cross-sectional area of the mass element 7121 perpendicular to the vibration direction of the mass element 7121, and $A_0$ refers to the cross-sectional area of the first acoustic cavity 7131 perpendicular to the vibration direction of the mass element 7121.

Further, according to Equations (10) and (11), the sensitivity of the vibration sensor 700 may be denoted as:

$$s \propto \frac{\Delta p}{p_0} = \frac{\Delta h\left(A_1 + A_0 + \sqrt{A_1 A_0}\right)}{3V_0}. \tag{12}$$

Figure 8:
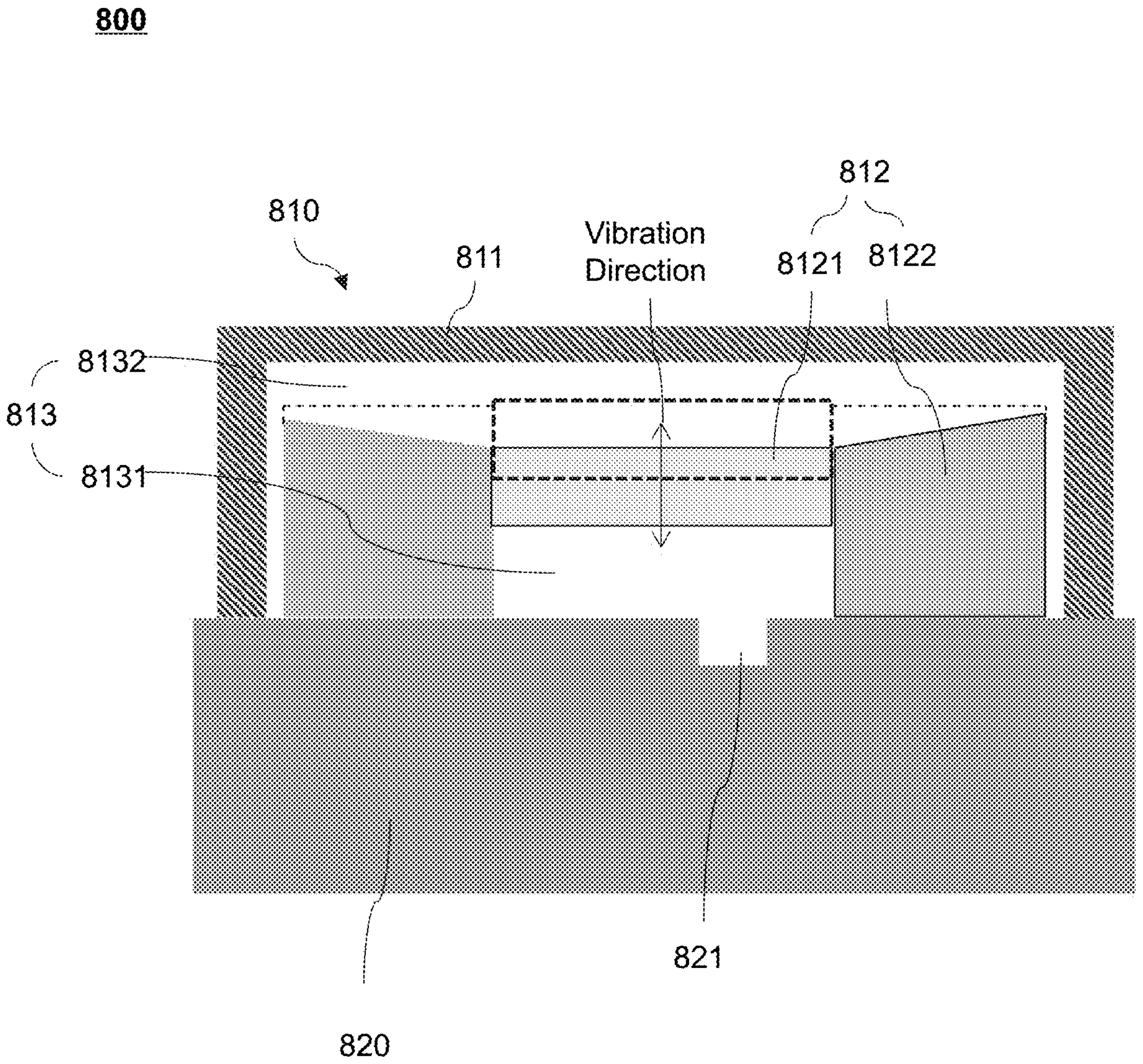
FIG. 8 is a schematic diagram illustrating a structure of a vibration sensor according to some embodiments of the present disclosure.

FIG. 8 is a schematic diagram illustrating a structure of a vibration sensor 800 according to some embodiments of the present disclosure. As shown in FIG. 8, the vibration sensor 800 may include a vibration receiver 810 and an acoustic transducer 820. The vibration receiver 810 may include a housing 811 and a vibration unit 812. The housing 811 may be connected to the acoustic transducer 820 to form a package structure having an acoustic cavity 813. The vibration unit 812 may be located in the acoustic cavity 813 of the package structure. The vibration unit 812 may divide the acoustic cavity 813 into a first acoustic cavity 8131 and a second acoustic cavity 8132. The vibration unit 212 may include a mass element 8121 and an elastic element 8122. The elastic element 8122 may be connected around a sidewall of the mass element 8121 and extend to the acoustic transducer to connect to the acoustic transducer 820 directly or indirectly. The structure and components of the vibration sensor 800 are the same as or similar to the structure and components of the vibration sensor 200 described in FIG. 2, details thereof may be found in FIGS. 2-5, which are not repeated herein.

It should be noted that, as shown in FIG. 8, since the elastic element 8122 is connected around the sidewall of the mass element 8121, a cross-sectional area of the mass element 8121 perpendicular to its vibration direction is approximately equal to a cross-sectional area of the first acoustic cavity 8131 perpendicular to the vibration direction of the mass element 8121. In some embodiments, a deviation between the cross-sectional areas of the mass element 8121 and the first acoustic cavity 8131 perpendicular to the vibration direction of the mass element 8121 is less than 25%. In some embodiments, the deviation refers to a ratio of an absolute value of a difference between the cross-sectional area of the mass element 8121 and the first acoustic cavity 8131 perpendicular to the vibration direction of the mass element 8121 to the cross-sectional area of the mass element 8121 perpendicular to the vibration direction of the mass element 8121. For example, the cross-sectional area of the mass element 8121 perpendicular to the vibration direction of the mass element 8121 is ¾-5/4 of the cross-sectional area of the first acoustic cavity 8131 perpendicular to the vibration direction of the mass element 8121. In some embodiments, the cross-sectional area of the first acoustic cavity 8131 perpendicular to the vibration direction of the mass element 8121 may be a cross-section area of the first acoustic cavity 8131 close to the mass element 8121. The "close to" may refer to that a distance between the cross-section and a lower surface of the mass element 8121 is less than a distance between the cross-section and an upper surface of the acoustic transducer 820. In some embodiments, the lower surface of the mass element 8121 is a surface of the mass element 8121 close to the acoustic transducer 820, and the upper surface of the acoustic transducer 820 is a surface of the acoustic transducer 820 close to the mass element 8121. In some embodiments, the cross-sectional area of the first acoustic cavity 8131 perpendicular to the vibration direction of the mass element 8121 may be an average of areas of all cross-sections of the first acoustic cavity 8131 perpendicular to the vibration direction of the mass element 8121. In some embodiments, the cross-sectional area of the mass element 8121 perpendicular to the vibration direction of the mass element 8121 may be an area of the lower surface of the mass element 8121. In some embodiments, the cross-sectional area of mass element 8121 perpendicular to the vibration direction of the mass element 8121 may be an average of areas of all cross-sections of the mass element 8121 perpendicular to the vibration direction of the mass element 8121. In some embodiments, the cross-sectional area of the mass element 8121 perpendicular to the vibration direction of the mass element 8121 may be an area of the upper surface of the mass element 8121. In some embodiments, the upper surface of the mass element 8121 is a surface of the mass element 8121 away from the acoustic transducer 820.

As shown in FIG. 8, since the cross-sectional area of the mass element 8121 perpendicular to its vibration direction is approximately equal to the cross-sectional area of the first acoustic cavity 8131 perpendicular to the vibration direction of the mass element 8121, the vibration of the mass element 8121 up and down along its vibration direction would cause a volume change of the first acoustic cavity 8131. Since a shape of the volume change of the first acoustic cavity 8131 caused by the mass element 8121 may be approximated as a cylinder (or a cuboid), the volume change of the first acoustic cavity 8131 ΔV may be denoted as:

$$\Delta V \approx \Delta h A_0 \tag{13},$$

where Δh refers to a vibration amplitude of the mass element 8121, and $A_0$ refers to the cross-sectional area of the first acoustic cavity 8131 perpendicular to the vibration direction of the mass element 8121.

Further, according to equations (10) and (13), a sensitivity of the vibration sensor 800 may be denoted as:

$$s \propto \frac{\Delta p}{p_0} = \frac{\Delta h A_0}{V_0}, \tag{14}$$

where $\Delta p$ refers to an air pressure change of the first acoustic cavity 8131, $p_0$ refers to an initial air pressure of the first acoustic cavity 8131, and $V_0$ refers to an initial volume of the first acoustic cavity 8131. In some embodiments, the acoustic transducer 820 may include at least one air inlet 821, and the initial volume $V_0$ of the first acoustic cavity 8131 includes a volume of the at least one air inlet 821.

It can be seen from equation (14) that the sensitivity of the vibration sensor 800 may be proportional to a ratio of a product of the vibration amplitude $\Delta h$ of the mass element 8121 and the cross-sectional area $A_0$ of the first acoustic cavity 8131 perpendicular to the vibration direction of the mass element 8121 to the initial volume $V_0$ of the first acoustic cavity 8131. In some embodiments, structure parameters of the vibration sensor 800 may be designed to cause that the sensitivity s of the vibration sensor 800 is greater than a threshold value. For example, according to the above equation (9), a resonant frequency $\omega_0$ of the vibration sensor 800 may be designed by designing the structure parameters of the vibration sensor 800, thereby affecting the vibration amplitude $\Delta h$ of the mass element 8121 to cause the sensitivity of the vibration sensor 800 to meet needs. In some embodiments, the initial volume $V_0$ of the first acoustic cavity 8131 and/or the cross-sectional area $A_0$ of the first acoustic cavity 8131 perpendicular to the vibration direction of the mass unit 8121 may be set to cause that the sensitivity s of the vibration sensor 800 is greater than the threshold value. The threshold value may be adjusted by a designer according to practical needs.

It can be seen from equations (12) and (14), under the premise that the initial volume $V_0$ of the first acoustic cavity (e.g., the first acoustic cavity 7131, the first acoustic cavity 8131), the cross-sectional area $A_0$ perpendicular to the vibration direction of the mass element (e.g., the mass element 7121, the mass element 8121), and the vibration amplitude $\Delta h$ of the mass element are constant, when the cross-sectional area $A_1$ of the mass element perpendicular to its vibration direction is less than the cross-sectional area $A_0$ of the first acoustic cavity perpendicular to the vibration direction of the mass element, at the same resonant frequency (i.e. $\Delta h$ is the same), $$\frac{\Delta h A_0}{V_0} > \frac{\Delta h\left(A_1 + A_0 + \sqrt{A_1 A_0}\right)}{3V_0},$$

that is, the sensitivity of the vibration sensor 800 shown in FIG. 8 is greater than the sensitivity of the vibration sensor shown in FIG. 7.

In summary, in the present disclosure, the sensitivity of the vibration sensor (e.g., the vibration sensor 800) may be improved by arranging the cross-sectional area of the mass element (e.g., the mass element 8121) perpendicular to its vibration direction to be approximately equal to the cross-sectional area of the first acoustic cavity (e.g., the first acoustic cavity 8131) perpendicular to the vibration direction of the mass element.

In some embodiments, in a frequency range of 100 Hz-1000 Hz, the sensitivity of the vibration sensor 200 is greater than or equal to −40 dB. Preferably, in the frequency range of 100 Hz-1000 Hz, the sensitivity of the vibration sensor 200 is greater than or equal to −38 dB. More preferably, in the frequency range of 100 Hz-1000 Hz, the sensitivity of the vibration sensor 200 is greater than or equal to −36 dB. More preferably, in the frequency range of 100 Hz-1000 Hz, the sensitivity of the vibration sensor 200 is greater than or equal to −34 dB. More preferably, in the frequency range of 100 Hz-1000 Hz, the sensitivity of the vibration sensor 200 is greater than or equal to −32 dB. More preferably, in the frequency range of 100 Hz-1000 Hz, the sensitivity of the vibration sensor 200 is greater than or equal to −30 dB. More preferably, in the frequency range of 100 Hz-1000 Hz, the sensitivity of the vibration sensor 200 is greater than or equal to −28 dB. More preferably, in the frequency range of 100 Hz-1000 Hz, the sensitivity of the vibration sensor 200 is greater than or equal to −27 dB. More preferably, in the frequency range of 100 Hz-1000 Hz, the sensitivity of the vibration sensor 200 is greater than or equal to −26 dB. More preferably, in the frequency range of 100 Hz-1000 Hz, the sensitivity of the vibration sensor 200 is greater than or equal to −24 dB. More preferably, in the frequency range of 100 Hz-1000 Hz, the sensitivity of the vibration sensor 200 is greater than or equal to −22 dB. More preferably, in the frequency range of 100 Hz-1000 Hz, the sensitivity of the vibration sensor 200 is greater than or equal to −20 dB. More preferably, in the frequency range of 100 Hz-1000 Hz, the sensitivity of the vibration sensor 200 is greater than or equal to −18 dB. More preferably, in the frequency range of 100 Hz-1000 Hz, the sensitivity of the vibration sensor 200 is greater than or equal to −16 dB. More preferably, in the frequency range of 100 Hz-1000 Hz, the sensitivity of the vibration sensor 200 is greater than or equal to −14 dB. More preferably, in the frequency range of 100 Hz-1000 Hz, the sensitivity of the vibration sensor 200 is greater than or equal to 12 dB. More preferably, in the frequency range of 100 Hz-1000 Hz, the sensitivity of the vibration sensor 200 is greater than or equal to 12 dB. More preferably, in the frequency range of 100 Hz-1000 Hz, the sensitivity of the vibration sensor 200 is greater than or equal to −10 dB.

It should be noted that the above descriptions of the vibration sensor and the components thereof in FIGS. 6-8 are merely provided for the purposes of illustration, and not intended to limit the scope of the present disclosure. For those skilled in the art, various amendments and variations may be made to the vibration sensor under the teachings of the present disclosure. These amendments and variations do not depart from the scope of the present disclosure.

Figure 9:
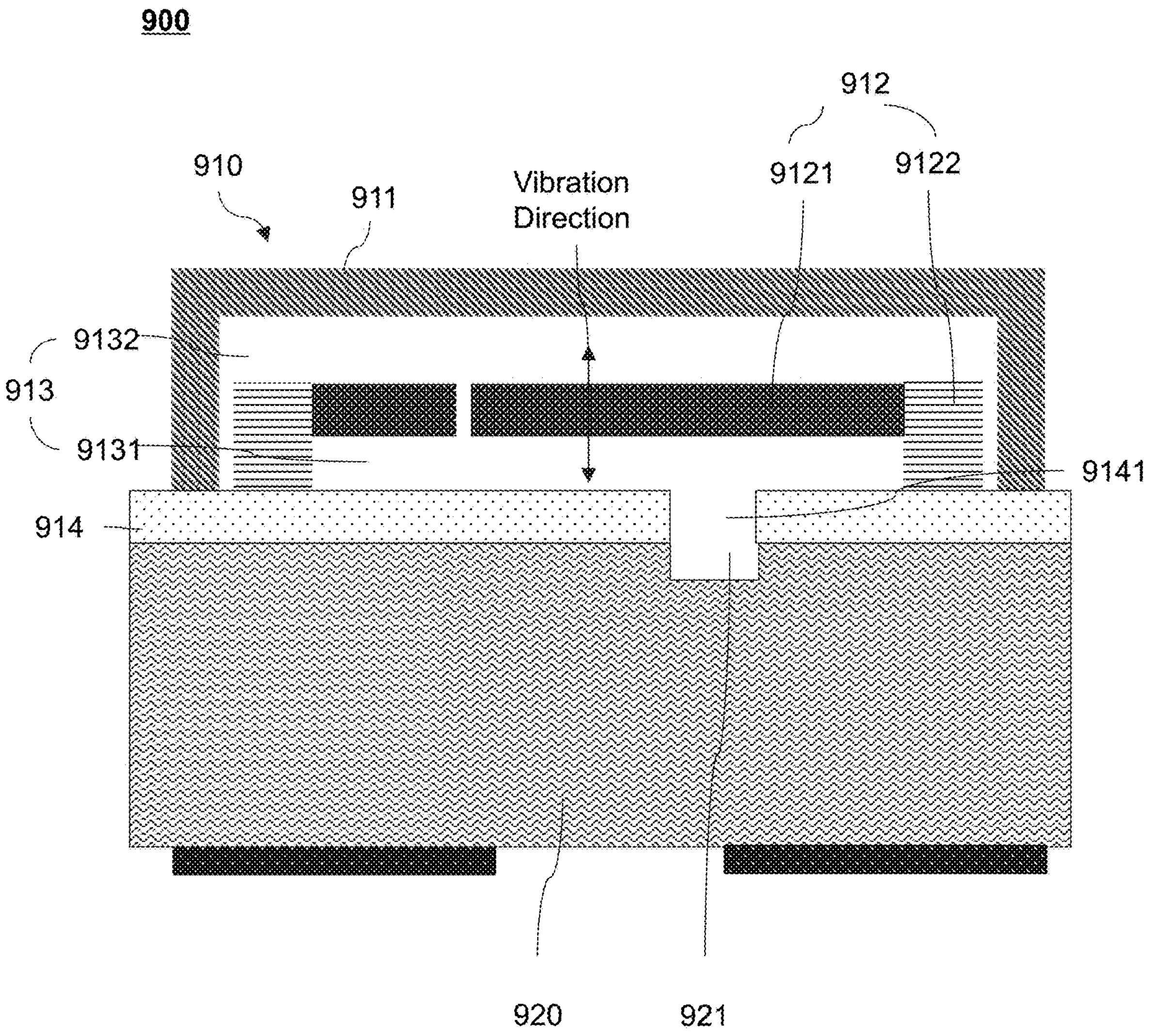
FIG. 9 is a schematic diagram illustrating a structure of a vibration sensor according to some embodiments of the present disclosure.

FIG. 9 is a schematic diagram illustrating a structure of a vibration sensor 900 according to some embodiments of the present disclosure. As shown in FIG. 9, the vibration sensor 900 may include a vibration receiver 910 and an acoustic transducer 920. The vibration receiver 910 may include a housing 911 and a vibration unit 912. The housing 911 may form an acoustic cavity 913. The vibration unit 912 may be located in the acoustic cavity 913 and divide the acoustic cavity 913 into a first acoustic cavity 9131 and a second acoustic cavity 9132. The vibration unit 912 may include a mass element 9121 and an elastic element 9122. The elastic element 9122 may be connected around a sidewall of the mass element 9121 and extend to the acoustic transducer 920 to indirectly connect to the acoustic transducer 920. The structure and components of the vibration sensor 900 are the same as or similar to the structure and components of the vibration sensor 200 described in FIG. 2, details thereof may be found in FIGS. 2-5, which are not repeated herein.

In some embodiments, the vibration receiver 910 may further include a substrate 914. The substrate 914 may be configured to fix and/or support other components of the vibration sensor 900. For example, the housing 911 may be physically connected to the substrate 914 to form the acoustic cavity 913. The substrate 914 may be arranged on the acoustic transducer 920. One end of the elastic element 9122 extending to the acoustic transducer 920 may be connected to the substrate 914, such that the substrate may fix and support the vibration unit 912. By setting the substrate, the vibration receiver 910 may be machined, manufactured, and sold as a separate assembly. The vibration receiver 910 having a substrate may be physically connected (e.g., glued) directly to an existing acoustic transducer 920 to obtain the vibration sensor 900, which simplifies a production process of the vibration sensor 900 and increases process flexibility for producing the vibration sensor 900. In some embodiments, a thickness of the substrate may be 10 um~300 um. Preferably, the thickness of the substrate may be 20 um~250 um. More preferably, the thickness of the substrate may be 30 um~200 um. More preferably, the thickness of the substrate may be 40 um~150 um. More preferably, the thickness of the substrate may be 50 um~150 um. More preferably, the thickness of the substrate may be 60 um~130 um. More preferably, the thickness of the substrate may be 70 um~170 um. More preferably, the thickness of the substrate may be 80 um~90 um. In some embodiments, the material of the substrate may include metal (e.g., iron, copper, stainless steel, etc.), alloy, non-metal (plastic, rubber, resin), or the like, or any combination thereof.

In some embodiments, the substrate 914 may include an air outlet 9141. The air outlet 9141 overlaps or partially overlaps with a projection of an air inlet 921 of the acoustic transducer 920 on a connection surface of the substrate 914 and the acoustic transducer 920, such that an acoustic pressure change in the first acoustic cavity 9131 may act on the acoustic transducer 920 through the air outlet 9141 and the air inlet 921 to generate an electrical signal.

In some embodiments, a resonant frequency of the vibration sensor 900 may be 2500 Hz-5000 Hz. More preferably, the resonant frequency of the vibration sensor 900 may be 3000 Hz-5000 Hz. More preferably, the resonant frequency of the vibration sensor 900 may be 3500 Hz-5000 Hz. More preferably, the resonant frequency of the vibration sensor 900 may be 4000 Hz-5000 Hz. More preferably, the resonant frequency of the vibration sensor 900 may be 4500 Hz-5000 Hz. More preferably, the resonant frequency of the vibration sensor 900 may be 2500 Hz-4500 Hz. More preferably, the resonant frequency of the vibration sensor 900 may be 2500 Hz-4000 Hz. More preferably, the resonant frequency of the vibration sensor 900 may be 2500 Hz-3500 Hz. More preferably, the resonant frequency of the vibration sensor 900 may be 2500 Hz-3000 Hz. In some embodiments, in a frequency range less than 1000 Hz, a sensitivity of the vibration sensor 200 is greater than or equal to −27 dB. Preferably, in the frequency range less than 1000 Hz, the sensitivity of the vibration sensor 200 is greater than or equal to −26 dB. More preferably, in the frequency range less than 1000 Hz, the sensitivity of the vibration sensor 200 is greater than or equal to −24 dB. More preferably, in the frequency range less than 1000 Hz, the sensitivity of the vibration sensor 200 is greater than or equal to −22 dB. More preferably, in the frequency range less than 1000 Hz, the sensitivity of the vibration sensor 200 is greater than or equal to −20 dB. More preferably, in the frequency range less than 1000 Hz, the sensitivity of the vibration sensor 200 is greater than or equal to −18 dB. More preferably, in the frequency range less than 1000 Hz, the sensitivity of the vibration sensor 200 is greater than or equal to −16 dB. More preferably, in the frequency range less than 1000 Hz, the sensitivity of the vibration sensor 200 is greater than or equal to −14 dB. More preferably, in the frequency range less than 1000 Hz, the sensitivity of the vibration sensor 200 is greater than or equal to −12 dB. More Preferably, in the frequency range less than 1000 Hz, the sensitivity of the vibration sensor 200 is greater than or equal to −10 dB.

Figure 10:
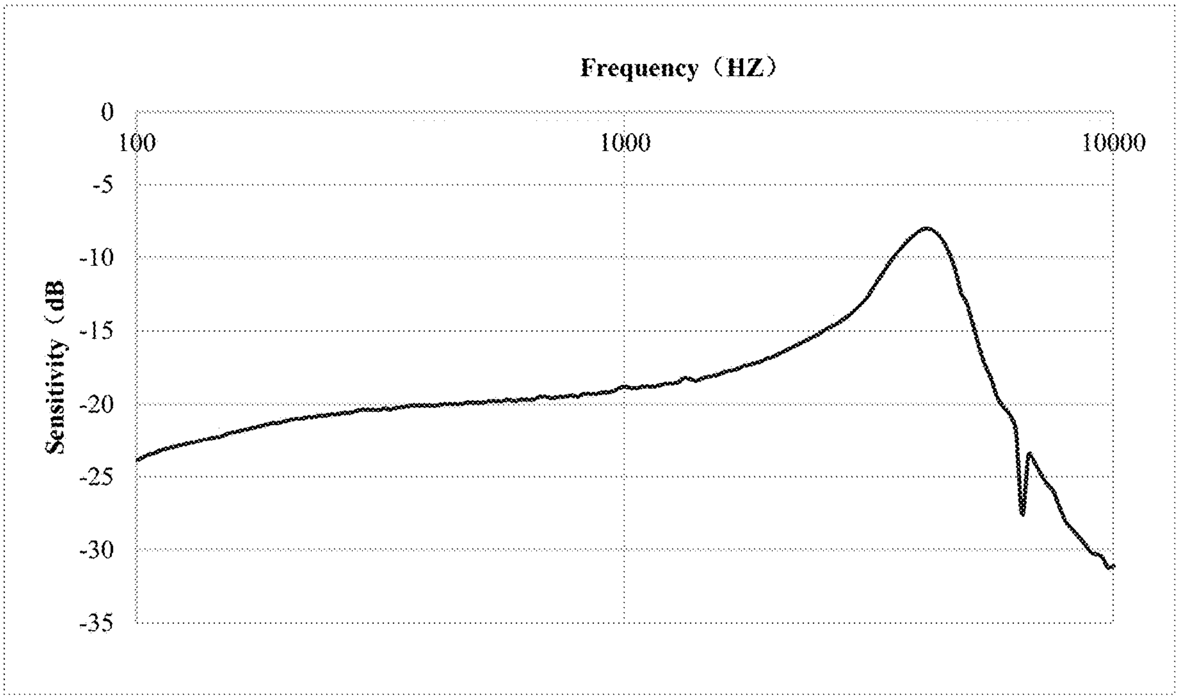
FIG. 10 is a schematic diagram illustrating a frequency response curve of a vibration sensor according to some embodiments of the present disclosure.

FIG. 10 is a schematic diagram illustrating a frequency response curve of the vibration sensor 900 according to some embodiments of the present disclosure. As shown in FIG. 10, the resonant frequency of the vibration sensor 900 is about 4500 Hz, and in the frequency range less than 1000 Hz, the sensitivity of the vibration sensor 200 is about −18 dB.

It should be noted that the above descriptions of the vibration sensor 900 and the components thereof in FIGS. 9-10 are merely provided for the purposes of illustration, and not intended to limit the scope of the present disclosure. For those skilled in the art, various amendments and variations may be made to the vibration sensor 900 under the teachings of the present disclosure. For example, the elastic element 9121 may be in direct contact with or spaced from the housing 911. These amendments and variations do not depart from the scope of the present disclosure.

Figure 11:
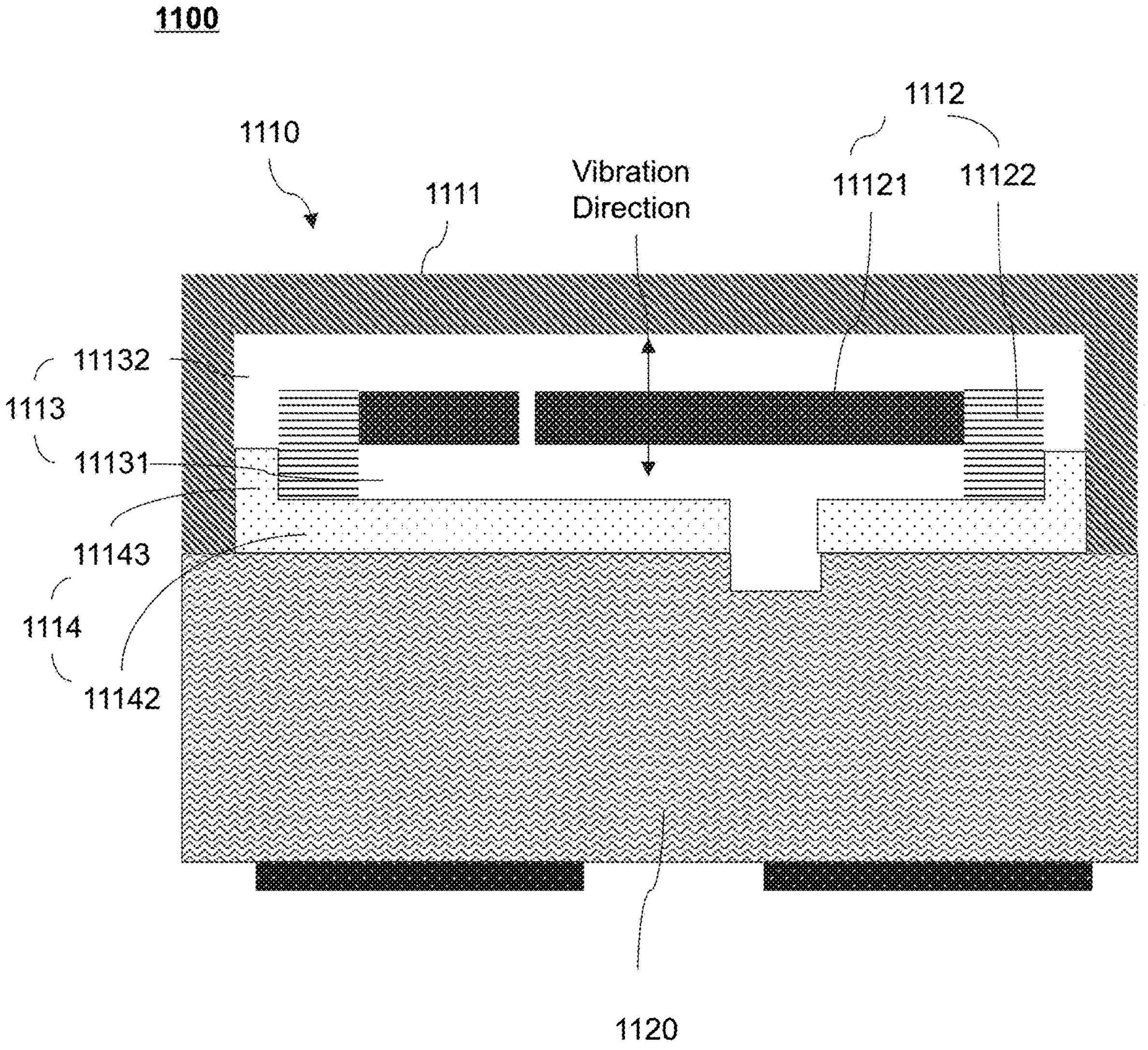
FIG. 11 is a schematic diagram illustrating a structure of a vibration sensor according to some embodiments of the present disclosure.

FIG. 11 is a schematic diagram illustrating a structure of a vibration sensor 1100 according to some embodiments of the present disclosure. As shown in FIG. 11, the vibration sensor 1100 may include a vibration receiver 1110 and an acoustic transducer 1120. The vibration receiver 1110 may include a housing 1111, a vibration unit 1112, and a substrate 1114. The housing 1111 may be connected to the substrate 1114 to form a package structure having an acoustic cavity 1113. The vibration unit 1112 may be located in the acoustic cavity 1113. The vibration unit 1112 may divide the acoustic cavity 1113 into a first acoustic cavity 1111 and a second acoustic cavity 1112. The vibration unit 1112 may include a mass element 11121 and an elastic element 11122. The elastic element 11122 may be connected around a sidewall of the mass element 11121 and extend to the acoustic transducer 1120 to directly connect to the substrate 1114. The vibration receiver 1110 may be arranged on the acoustic transducer 1120. The structure and components of the vibration sensor 1100 are the same as or similar to the structure and components of the vibration sensor 200 described in FIG. 2, details thereof may be found in FIGS. 2-5, which are not repeated herein.

In some embodiments, as shown in FIG. 11, the substrate 1114 may include a base plate 11142 and a sidewall 11143. The base plate 11142 may be connected to the acoustic transducer 1120. An inner surface of the sidewall 11143 may be connected to the elastic element 11122. In some embodiments, an outer surface of the sidewall 11143 may be in close contact with the housing 1111 to achieve packaging with the housing 1111. In some embodiments, the outer surface of the sidewall 11143 may not be in contact with the housing 1111, and the base plate 11142 of the substrate 1114 may extend to the housing 1111 and be in close contact with the housing 1111 to form a package. The setting of the sidewall 11143 may reduce the flow of the elastic element 11122 during a preparation of the vibration sensor 1100, so as to better control the shape and position of the elastic element 11122. In some embodiments, a thickness of the base plate 11142 is 50-150 um. Preferably, the thickness of the base plate 11142 is 60-140 um. More preferably, the thickness of the base plate 11142 is 70-130 um. More preferably, the thickness of the base plate 11142 is 80-120 um. More preferably, the thickness of the base plate 11142 is 90-110 um. More preferably, the thickness of the base plate 11142 is 95-105 um. In some embodiments, a length of the sidewall 11143 along a direction away from the base plate 11142 is 20-200 um. Preferably, the length of the sidewall 11143 along the direction away from the base plate 11142 is 30-180 um.

More preferably, the length of the sidewall 11143 along the direction away from the base plate 11142 is 40-160 um. More preferably, the length of the sidewall 11143 along the direction away from the base plate 11142 is 50-140 um. More preferably, the length of the sidewall 11143 along the direction away from the base plate 11142 is 60-120 um. More preferably, the length of the sidewall 11143 along the direction away from the base plate 11142 is 70-110 um. More preferably, the length of the sidewall 11143 along the direction away from the base plate 111142 is 80-100 um. More preferably, the length of the sidewall 11143 along the direction away from the base plate 111142 is 85-95 um.

It should be noted that the above descriptions of the vibration sensor 1100 and the components thereof in FIG. 11 are merely provided for the purposes of illustration, and not intended to limit the scope of the present disclosure. For those skilled in the art, various amendments and variations may be made to the vibration sensor 1100 under the teachings of the present disclosure. For example, the acoustic transducer 1120 may be in contact with (e.g., a physical connection) or spaced from the housing 1111. These amendments and variations do not depart from the scope of the present disclosure.

Figure 12:
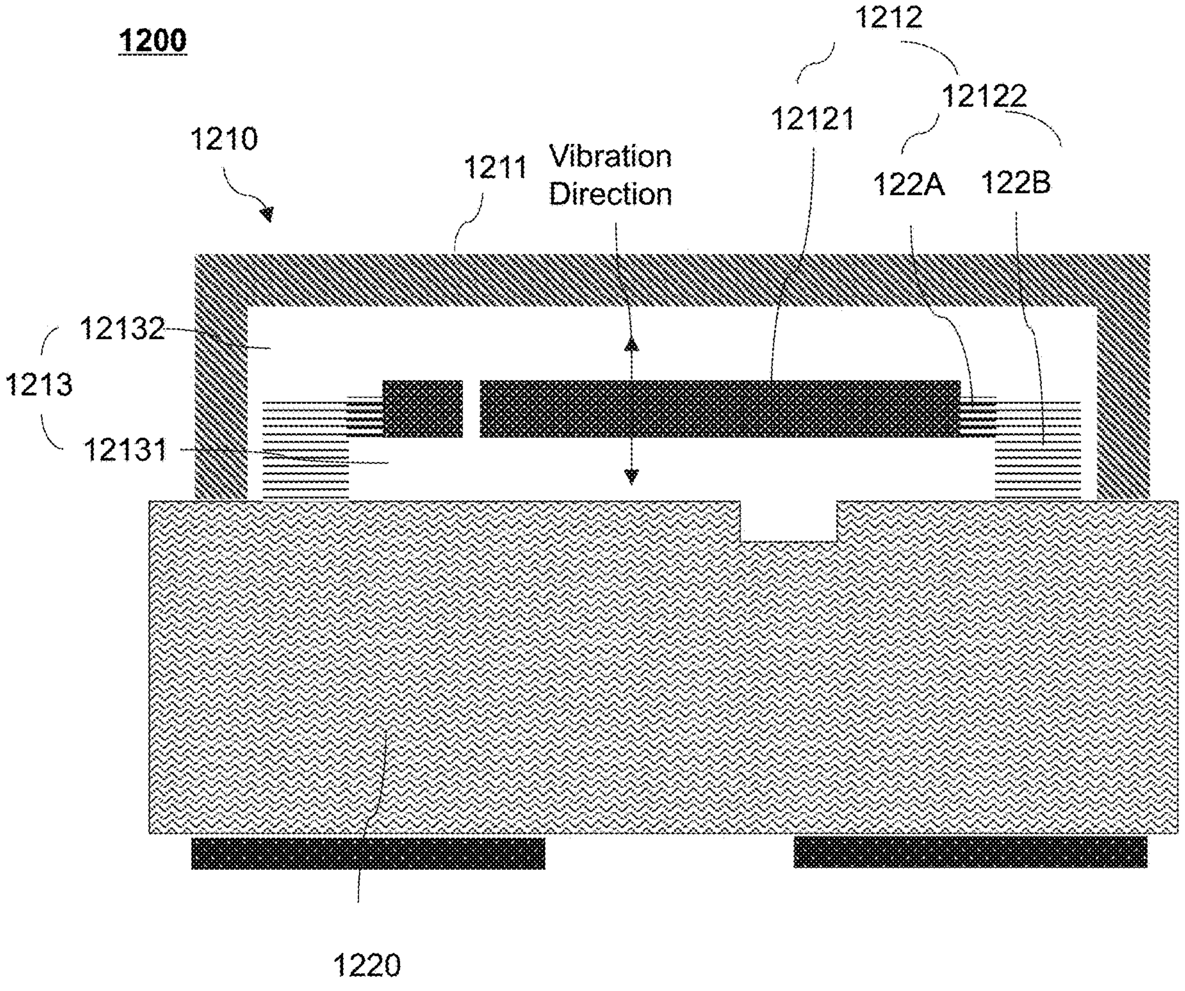
FIG. 12 is a schematic diagram illustrating a structure of a vibration sensor according to some embodiments of the present disclosure.

FIG. 12 is a schematic diagram illustrating a structure of a vibration sensor 1200 according to some embodiments of the present disclosure. As shown in FIG. 12, the vibration sensor 1200 may include a vibration receiver 1210 and an acoustic transducer 1220. The vibration receiver 1210 may include a housing 1211 and a vibration unit 1212. The housing 1211 may be connected to the acoustic transducer 1220 to form a package structure having an acoustic cavity 1213. The vibration unit 1212 may be located in the acoustic cavity 1213 of the package structure. The vibration unit 1212 may divide the acoustic cavity 1213 into a first acoustic cavity 12131 and a second acoustic cavity 12132. The vibration unit 1212 may include a mass element 12121 and an elastic element 12122. The elastic element 12122 may be connected around a sidewall of the mass element 12121 and extend to the acoustic transducer 1220 to connect to the acoustic transducer 1220 directly or indirectly. The structure and components of the vibration sensor 1200 are the same as or similar to the structure and components of the vibration sensor 200 described in FIG. 2, details thereof may be found in FIGS. 2-5, which are not repeated herein.

In some embodiments, the elastic element 12122 may include a first elastic portion 122A and a second elastic portion 122B. Two ends of the first elastic portion 122A are connected to sidewalls of the mass element 12121 and the second elastic portion 122B, respectively. The second elastic portion 122B extends to the acoustic transducer 1220 and is connected to the acoustic transducer 1220 directly or indirectly. For example, one end of the second elastic portion 122B extending to the acoustic transducer 1220 may be physically connected (e.g., glued) directly to the acoustic transducer 1220. As another example, the vibration receiver 1210 may include the substrate through which one end of the second elastic portion 122B extending toward the acoustic transducer 1220 may be connected to the acoustic transducer 1220. The substrate is the same as or similar to the substrates 914 and 1114 described in FIGS. 9 and 10, details thereof may be found in FIGS. 9 and 10, which are not repeated herein. In the embodiments, the first elastic portion 122A is not connected/in contact with the acoustic transducer 1220 or the substrate, which effectively reduces the stiffness of the elastic element 12122, thereby increasing the vibration amplitude of the mass element 12121 during a vibration process of the vibration unit 1212, and accordingly reducing the resonant frequency of the vibration sensor 1200 and improving the sensitivity of the vibration sensor 1200. In some embodiments, a resonant frequency of the vibration sensor 1200 may be 1000 Hz-4000 Hz. Preferably, the resonant frequency of the vibration sensor 1200 may be 1000 Hz-3500 Hz. More preferably, the resonant frequency of the vibration sensor 1200 may be 1000 Hz-3000 Hz. More preferably, the resonant frequency of the vibration sensor 1200 may be 1000 Hz-2500 Hz. More preferably, the resonant frequency of the vibration sensor 1200 may be 1000 Hz-2000 Hz. More preferably, the resonant frequency of the vibration sensor 1200 may be 1000 Hz-1500 Hz. More preferably, the resonant frequency of the vibration sensor 1200 may be 1500 Hz-4000 Hz. More preferably, the resonant frequency of the vibration sensor 1200 may be 2000 Hz-4000 Hz. More preferably, the resonant frequency of the vibration sensor 1200 may be 2500 Hz-4000 Hz. More preferably, the resonant frequency of the vibration sensor 1200 may be 3000 Hz-4000 Hz. More preferably, the resonant frequency of the vibration sensor 1200 may be 3500 Hz-4000 Hz. More preferably, the resonant frequency of the vibration sensor 1200 may be 2000 Hz-3500 Hz. More preferably, the resonant frequency of the vibration sensor 1200 may be 2500 Hz-3000 Hz.

In some embodiments, the first elastic portion 122A and the second elastic portion 122B may be prepared of the same or different materials. Merely by way of example, the materials of the first elastic portion 122A and the second elastic portion 122B may include silicone rubber, silicone gel, silicone sealant, or the like, or any combination thereof. In some embodiments, Shore hardness of the first elastic portion 122A and the second elastic portion 122B may be 0.1-100 HA. Preferably, the Shore hardness of the first elastic portion 122A and the second elastic portion 122B may be 0.2-95 HA. More preferably, the Shore hardness of the first elastic portion 122A and the second elastic portion 122B may be 0.3-90 HA. More preferably, the Shore hardness of the first elastic portion 122A and the second elastic portion 122B may be 0.4-85 HA. More preferably, the Shore hardness of the first elastic portion 122A and the second elastic portion 122B may be 0.5-80 HA. More preferably, the Shore hardness of the first elastic portion 122A and the second elastic portion 122B may be 0.6-75 HA. More preferably the Shore hardness of the first elastic More preferably, the Shore hardness of the first elastic portion 122A and the second elastic portion 122B may be 0.7-70 HA. More preferably, the Shore hardness of the first elastic portion 122A and the second elastic portion 122B may be 0.8-65 HA. More preferably, the Shore hardness of the first elastic portion 122A and the second elastic portion 122B may be 0.9-60 HA. More preferably, the Shore hardness of the first elastic portion 122A and the second elastic portion 122B may be 1-55 HA. More preferably, the Shore hardness of the first elastic portion 122A and the second elastic portion 122B may be 1-50 HA. More preferably, the Shore hardness of the first elastic portion 122A and the second elastic portion 122B may be 1-45 HA. More preferably, the Shore hardness of the first elastic portion 122A and the second elastic portion 122B may be 1-40 HA. More preferably, the Shore hardness of the first elastic portion 122A and the second elastic portion 122B may be 1-35 HA. More preferably, the Shore hardness of the first elastic portion 122A and the second elastic portion 122B may be 1-30 HA. More preferably, the Shore hardness of the first elastic portion 122A and the second elastic portion 122B may be 1-25 HA. More preferably, the Shore hardness of the first elastic portion 122A and the second elastic portion 122B may be 1-25 HA. Preferably, the Shore hardness of the first elastic portion 122A and the second elastic portion 122B may be 1-20 HA. More preferably, the Shore hardness of the first elastic portion 122A and the second elastic portion 122B may be 1-15 HA. More preferably, the Shore hardness of the first elastic portion 122A and the second elastic portion 122B may be 1-10 HA.

In some embodiments, a thickness of the first elastic portion 122A along a vibration direction of the mass element 12121 is 10-300 um. Preferably, the thickness of the first elastic portion 122A along the vibration direction of the mass element 12121 is 20-280 um. More preferably, the thickness of the first elastic portion 122A along the vibration direction of the mass element 12121 is 30-260 um. More preferably, the thickness of the first elastic portion 122A along the vibration direction of the mass element 12121 is 40-240 um. More preferably, the thickness of the first elastic portion 122A along the vibration direction of the mass element 12121 is 50-240 um. More preferably, the thickness of the first elastic portion 122A along the vibration direction of the mass element 12121 is 50-220 um. More preferably, the thickness of the first elastic portion 122A along the vibration direction of the mass element 12121 is 50-220 um. More preferably, the thickness of the first elastic portion 122A along the vibration direction of the mass element 12121 is 50-200 um. More preferably, the thickness of the first elastic portion 122A along the vibration direction of the mass element 12121 is 60-180 um. More preferably, the thickness of the first elastic portion 122A along the vibration direction of the mass element 12121 is 70-160 um. More preferably, the thickness of the first elastic portion 122A along the vibration direction of the mass element 12121 is 80-140 um. More preferably, the thickness of the first elastic portion 122A along the vibration direction of the mass element 12121 is 90-120 um. More preferably, the thickness of the first elastic portion 122A along the vibration direction of the mass element 12121 is 100-110 um.

In some embodiments, a length of the first elastic portion 122A along a direction perpendicular to the vibration direction of the mass element 12121 (i.e., a width from one side close to the mass element 12121 to the other side away from the mass element 12121) is 10-300 um. In some embodiments, the width of the first elastic portion 122A from the one side close to the mass element 12121 to the other side away from the mass element 12121 is 20-280 um. In some embodiments, the width of the first elastic portion 122A from the one side close to the mass element 12121 to the other side away from the mass element 12121 is 30-260 um. In some embodiments, the width of the first elastic portion 122A from the one side close to the mass element 12121 to the other side away from the mass element 12121 is 40-240 um. In some embodiments, the width of the first elastic portion 122A from the one side close to the mass element 12121 to the other side away from the mass element 12121 is 50-240 um. In some embodiments, the width of the first elastic portion 122A from the one side close to the mass element 12121 to the other side away from the mass element 12121 is 50-220 um. In some embodiments, the width of the first elastic portion 122A from the one side close to the mass element 12121 to the other side away from the mass element 12121 is 50-200 um. In some embodiments, the width of the first elastic portion 122A from the one side close to the mass element 12121 to the other side away from the mass element 12121 is 60-180 um. In some embodiments, the width of the first elastic portion 122A from the one side close to the mass element 12121 to the other side away from the mass element 12121 is 70-160 um. In some embodiments, the width of the first elastic portion 122A from the one side close to the mass element 12121 to the other side away from the mass element 12121 is 80-140 um. In some embodiments, the width of the first elastic portion 122A from the one side close to the mass element 12121 to the other side away from the mass element 12121 is 90-120 um. In some embodiments, the width of the first elastic portion 122A from the one side close to the mass element 12121 to the other side away from the mass element 12121 is 100-110 um. In some embodiments, a width of the second elastic portion 122B from one side close to the mass element 12121 to the other side away from the mass element 12121 is 20-280 um. In some embodiments, the width of the second elastic portion 122B from the one side close to the mass element 12121 to the other side away from the mass element 12121 is 30-260 um. In some embodiments, the width of the second elastic portion 122B from the one side close to the mass element 12121 to the other side away from the mass element 12121 is 40-240 um. In some embodiments, the width of the second elastic portion 122B from the one side close to the mass element 12121 to the other side away from the mass element 12121 is 50-240 um. In some embodiments, the width of the second elastic portion 122B from the one side close to the mass element 12121 to the other side away from the mass element 12121 is 50-220 um. In some embodiments, the width of the second elastic portion 122B from the one side close to the mass element 12121 to the other side away from the mass element 12121 is 50-200 um. In some embodiments, the width of the second elastic portion 122B from the one side close to the mass element 12121 to the other side away from the mass element 12121 is 60-180 um. In some embodiments, the width of the second elastic portion 122B from the one side close to the mass element 12121 to the other side away from the mass element 12121 is 70-160 um. In some embodiments, the width of the second elastic portion 122B from the one side close to the mass element 12121 to the other side away from the mass element 12121 is 80-140 um. In some embodiments, the width of the second elastic portion 122B from the one side close to the mass element 12121 to the other side away from the mass element 12121 is 90-120 um. In some embodiments, the width of the second elastic portion 122B from the one side close to the mass element 12121 to the other side away from the mass element 12121 is 100-110 um.

It should be noted that the above descriptions of the vibration sensor 1200 and the components thereof in FIG. 11 are merely provided for the purposes of illustration, and not intended to limit the scope of the present disclosure. For those skilled in the art, various amendments and variations may be made to the vibration sensor 1200 under the teachings of the present disclosure. For example, the acoustic transducer 1220 may be in contact with (e.g., a physical connection) or spaced from the housing 1211. These amendments and variations do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A vibration sensor, comprising:

a vibration receiver including a housing and a vibration unit, the housing forming an acoustic cavity, the vibration unit being located in the acoustic cavity and dividing the acoustic cavity into a first acoustic cavity and a second acoustic cavity; and an acoustic transducer acoustically connected to the first acoustic cavity, wherein:

the housing is configured to generate vibration based on an external vibration signal, the vibration unit vibrating in response to the vibration of the housing and transmitting, through the first acoustic cavity, the vibration to the acoustic transducer to generate an electrical signal, the vibrating unit includes a mass element and an elastic element, a deviation between cross-sectional areas of the mass element and the first acoustic cavity perpendicular to a vibration direction of the mass element being less than 25%; and a sensitivity of the vibration sensor is proportional to:

a ratio of an air pressure change of the first acoustic cavity to an initial air pressure of the first acoustic cavity, or a ratio of a volume change of the first acoustic cavity to an initial volume of the acoustic cavity, or a ratio of a product of a vibration amplitude of the mass element and the cross-sectional area of the first acoustic cavity perpendicular to the vibration direction of the mass element to an initial volume of the first acoustic cavity, wherein by setting at least one of the initial volume of the first acoustic cavity, the cross-sectional area of the first acoustic cavity perpendicular to the vibration direction of the mass element, and a resonant frequency of the vibration sensor, the sensitivity of the vibration sensor is greater than a threshold.

2. The vibration sensor of claim 1, wherein in a frequency range less than 1000 Hz, the sensitivity of the vibration sensor is greater than or equal to −40 dB.

3. The vibration sensor of claim 1, wherein the vibration amplitude of the mass element is inversely proportional to a square of the resonant frequency of the vibration sensor.

4. The vibration sensor of claim 3, wherein the acoustic transducer includes at least one air inlet, the initial volume of the first acoustic cavity including a volume of the at least one air inlet.

5. The vibration sensor of claim 1, wherein the elastic element is connected around a sidewall of the mass element, the sidewall of the mass element being parallel to the vibration direction of the mass element, and the elastic element extends to the acoustic transducer and is connected to the acoustic transducer directly or indirectly.

6. The vibration sensor of claim 5, wherein a width of the elastic element from one side close to the mass element to the other side away from the mass element is 10-500 micrometers (um).

7. The vibration sensor of claim 5, wherein a width of the elastic element from one side close to the mass element to the other side away from the mass element is variable, and the variation is less than or equal to 300 micrometers (um).

8. The vibration sensor of claim 5, wherein the housing is connected to the acoustic transducer, and one end of the elastic element extending to the acoustic transducer is directly connected to the acoustic transducer.

9. The vibration sensor of claim 5, wherein the vibration receiver further includes a substrate arranged on the acoustic transducer, one end of the elastic element extending to the acoustic transducer being connected to the substrate.

10. The vibration sensor of claim 9, wherein the substrate includes a base plate and a sidewall, the sidewall extending from the base plate in a direction away from the acoustic transducer, the base plate being connected to the acoustic transducer, an inner surface of the sidewall being connected to the elastic element.

11. The vibration sensor of claim 10, wherein a thickness of the base plate is 50-150 micrometers (um), and a length of the sidewall along a direction away from the base plate is 20-200 um.

12. The vibration sensor of claim 1, wherein the resonant frequency of the vibration sensor is 1000 Hz-5000 Hz.

13. The vibration sensor of claim 1, wherein the elastic element is in direct contact or spaced from the housing.

14. The vibration sensor of claim 1, wherein the elastic element includes a first elastic portion and a second elastic portion, the first elastic portion being connected to the second elastic portion in a direction perpendicular to the vibration direction of the mass element, two ends of the first elastic portion being respectively connected to a sidewall of the mass element and the second elastic portion, the second elastic portion extending to the acoustic transducer and being connected to the acoustic transducer directly or indirectly.

15. The vibration sensor of claim 1, wherein a volume of the first acoustic cavity is smaller than a volume of the second acoustic cavity.

16. The vibration sensor of claim 1, wherein a height of the first acoustic cavity along the vibration direction of the mass element is 1-100 micrometers (um), and a height of the second acoustic cavity along the vibration direction of the mass element is 50-200 um.

17. The vibration sensor of claim 1, wherein a thickness of the mass element along the vibration direction of the mass element is 50-1000 micrometers (um).

18. The vibration sensor of claim 1, wherein the elastic element is spaced from the housing.

19. A vibration sensor, comprising:

a vibration receiver including a housing and a vibration unit, the housing forming an acoustic cavity, the vibration unit being located in the acoustic cavity and dividing the acoustic cavity into a first acoustic cavity and a second acoustic cavity; and an acoustic transducer acoustically connected to the first acoustic cavity, wherein:

the housing is configured to generate vibration based on an external vibration signal, the vibration unit vibrating in response to the vibration of the housing and transmitting, through the first acoustic cavity, the vibration to the acoustic transducer to generate an electrical signal, the vibrating unit includes a mass element and an elastic element, a deviation between cross-sectional areas of the mass element and the first acoustic cavity perpendicular to a vibration direction of the mass element being less than 25%, the elastic element is connected around a sidewall of the mass element, and the elastic element extending to the acoustic transducer and being connected to the acoustic transducer directly or indirectly, and a width of the elastic element from one side close to the mass element to the other side away from the mass element is variable, and the variation being less than or equal to 300 micrometers (um).

20. A vibration sensor, comprising:

a vibration receiver including a housing and a vibration unit, the housing forming an acoustic cavity, the vibration unit being located in the acoustic cavity and dividing the acoustic cavity into a first acoustic cavity and a second acoustic cavity; and an acoustic transducer acoustically connected to the first acoustic cavity, wherein:

the housing is configured to generate vibration based on an external vibration signal, the vibration unit vibrating in response to the vibration of the housing and transmitting, through the first acoustic cavity, the vibration to the acoustic transducer to generate an electrical signal, the vibrating unit includes a mass element and an elastic element, a deviation between cross-sectional areas of the mass element and the first acoustic cavity perpendicular to a vibration direction of the mass element being less than 25%, and a height of the first acoustic cavity along the vibration direction of the mass element is 1-100 micrometers (um), and a height of the second acoustic cavity along the vibration direction of the mass element is 50-200 um.

* * * * *